(12) United States Patent
Muraoka et al.

(10) Patent No.: US 9,917,843 B2
(45) Date of Patent: Mar. 13, 2018

(54) SECURE DATA MANAGEMENT TECHNIQUES

(71) Applicant: Kii, Inc., San Mateo, CA (US)

(72) Inventors: Taro Muraoka, Tokyo (JP); Susumu Ishizuka, Tokyo (JP); Makoto Iguchi, Tokyo (JP)

(73) Assignee: Kii, Inc., San Mateo, CA (US)

( * ) Notice: Subject to any disclaimer, the term of this patent is extended or adjusted under 35 U.S.C. 154(b) by 137 days.

(21) Appl. No.: 14/989,294

(22) Filed: Jan. 6, 2016

(65) Prior Publication Data

US 2016/0197934 A1 Jul. 7, 2016

Related U.S. Application Data

(60) Provisional application No. 62/100,612, filed on Jan. 7, 2015.

(51) Int. Cl.
*G06F 7/04* (2006.01)
*H04L 29/06* (2006.01)
(Continued)

(52) U.S. Cl.
CPC ............ *H04L 63/104* (2013.01); *G06F 21/34* (2013.01); *G06F 21/44* (2013.01); *H04L 9/3247* (2013.01);
(Continued)

(58) Field of Classification Search
CPC .................................................... H04L 63/104
(Continued)

(56) References Cited

U.S. PATENT DOCUMENTS

2013/0268767 A1* 10/2013 Schrecker ............... G06F 21/31
713/185
2014/0189808 A1 7/2014 Mahaffey et al.
(Continued)

FOREIGN PATENT DOCUMENTS

EP 2736215 A1 5/2014
EP 2770458 A2 8/2014

OTHER PUBLICATIONS

International Search Report and Written Opinion for PCT/US2016/012527, dated May 19, 2016, 13 pages.

*Primary Examiner* — Christopher Brown
(74) *Attorney, Agent, or Firm* — Kilpatrick Townsend & Stockton LLP

(57) ABSTRACT

The present disclosure relates generally to secure data management techniques. Techniques are described for pairing devices and using the pairing information for granting or denying requests (e.g., data exchange requests) from the devices, for example, in a cloud environment, including Internet of Things (IoT) cloud. Devices can be paired with each other according to their identification information. Subsequently, when an original request is received from a first device, and a chasing request received from a second device, the pre-registered pairing information is used to determine whether the first and second devices form a valid pair and the original request is granted or denied based upon that determination. For example, the request may be granted only if it is determined that the first device and the second device have been previously paired. In certain embodiments, in addition to the pairing check, additional checks may be performed to determine whether to grant or deny the original request from the first device.

20 Claims, 15 Drawing Sheets

(51) Int. Cl.
*H04L 9/32* (2006.01)
*G06F 21/34* (2013.01)
*G06F 21/44* (2013.01)

(52) U.S. Cl.
CPC ...... *H04L 63/0853* (2013.01); *H04L 63/0876* (2013.01); *G06F 2221/2115* (2013.01)

(58) Field of Classification Search
USPC .......................................................... 726/7
See application file for complete search history.

(56) References Cited

U.S. PATENT DOCUMENTS

2014/0237236 A1\* 8/2014 Kalinichenko ......... G06F 21/43
  713/168
2014/0304516 A1  10/2014 Fahrny et al.

\* cited by examiner

SECURE DATA MANAGEMENT TECHNIQUES

CROSS-REFERENCES TO RELATED APPLICATION

This application is a non-provisional application and claims the benefit and priority of U.S. Provisional Application No. 62/100,612, filed on Jan. 7, 2015 titled "SYSTEMS AND METHODS FOR SECURING IOT DEVICES," which is herein incorporated by reference in its entirety for all purposes.

BACKGROUND

The present disclosure relates generally to secure data management techniques. In particular, the disclosure relates to pairing devices and using the pairing information for granting or denying requests (e.g., data exchange requests) from the devices, for example, in a cloud environment, including Internet of Things (IoT) cloud.

With increasing proliferation of computing devices, the amount of data stored by such devices, accessed using these devices, and exchanged between such devices continues to increase at an astounding pace. Securing the ability of these devices to access data and to exchange data between such devices is a big concern. The problem has further exacerbated due to the rise of cloud environments where several devices could be communicatively coupled to the cloud and can access data from the cloud or use the cloud to exchange data with other devices.

For example, the Internet of Things (IoT) can be a network of devices. These IoT devices, for example, are programmed to collect and exchange data. IoT allows these devices to be sensed and controlled in a network infrastructure. An IoT cloud may need to properly identify devices so as to provide secure data management. For example, data that is uploaded by a first device should not be accessible by a second device unless, for example, authorized by a user of the first device. Further, particular data should only be accessible by certain devices.

Devices can be distinguished from each other according to their identification information ID. Such an ID can be unique to a device and can thus be used to uniquely identify the device from other devices. For example, an ID can be a string of characters. Some conventional secure data exchange schemes use device IDs to control access to data, but such schemes are limited and have inherent problems. For example, when a device is stolen, the stolen device can still send its ID to the IoT cloud and therefore can be granted access to data stored on the cloud. A similar issue may apply to a "copied" device or a "spoofed" device where the copied or fake device may access the data uploaded by a legitimate device if the fake device knows and can spoof the ID of the legitimate device. Therefore, unauthorized devices may be able to access data stored in a cloud, such as an IoT cloud.

BRIEF SUMMARY

The present disclosure relates generally to secure data management techniques. In particular, the disclosure relates to pairing devices and using the pairing information for granting or denying requests (e.g., data exchange requests) from the devices, for example, in a cloud environment, including Internet of Things (IoT) cloud.

In certain embodiments, techniques (e.g., a system, a method, a memory or non-transitory computer readable medium storing code or instructions executable by one or more processors) are described for establishing secure data management in a cloud environment. For example, in certain embodiments, the secure data management techniques disclosed by the present disclosure can be used to securely exchange data in an Internet of Things (IoT) cloud environment. Certain embodiments are described for securing the exchange of data, where the exchange can be from the device to a data store (e.g., the device is trying to download data to a data store), or from the data store to the device (e.g., the device is trying to access data stored by the data store).

In certain embodiments, devices can be paired with each other according to their identification information prior to accessing data stored in the cloud. When a first device requests, for example, information managed by a server storing the data, it is determined whether the first device and a second device have been paired. Further, request information from the first device and the second device is obtained. The request information can include a request for data exchange (e.g. for data managed by the server). If the first device and the second device have been paired and the request information from the first device and the second device match, then the server may respond to the request made by the first device.

In certain embodiment, the first device and the second device may each send the request information, or alternatively, the second device can send the request information regarding the first device and the second device.

In accordance with certain embodiments, a method can include receiving, by a server, a request from a first device to register the first device and a second device as paired devices, wherein the first device has a first identifier and the second device has a second identifier, storing the first identifier and the second identifier as a valid pair; receiving an original request from the first device, wherein the original request includes the first identifier associated with the first device, receiving a chasing request from the second device, wherein the chasing request includes the second identifier associated with the second device, determining whether the first device and the second device are the valid pair based on the first identifier in the original request and the second identifier in the chasing request, determining whether a portion of information in the original request and a portion of information in the chasing request match; granting the original request upon determining that the first device and the second device are the valid pair, and upon determining that the portion of the original request matches the portion of the chasing request; and denying the original request upon determining either that the first device and the second device are not a valid pair, or that the portion of the original request does not match the portion of the chasing request.

In certain embodiments, the first identifier can include unique identification information that identifies the first device and the second identifier can include unique identification information that identifies the second device.

In certain embodiments, the first identifier can include a unique identification number of the first device and the second identifier can include a unique identification number of the second device.

In certain embodiments, the first identifier can include a unique hash value of the first device and the second identifier can include a unique hash value of the second device.

In certain embodiments, the responding to the original request can include granting the first device access to content managed by the server.

In certain embodiments, the first device sends a first message to the second device subsequent to sending the original request to the server and the first message requests the second device to send the chasing request.

In certain embodiments, the server sends a server message to the second device subsequent to receiving the original request from the first device and the server message requests the second device to send the chasing request.

In certain embodiments, the portion of information in the original request and the portion of information in the chasing request match when content of the original request and content of the chasing request are the same.

In certain embodiments, the portion of information in the original request and the portion of information in the chasing request match when a hash value of the original request and a hash value of the chasing request are the same.

In accordance with certain embodiments, a system can include a memory and one or more processors coupled to the memory and configured to receive a request from a first device to register the first device and a second device as paired devices, wherein the first device has a first identifier and first additional information and the second device has a second identifier and second additional information, store the first identifier and the first additional information of the first device with the second identifier and the second additional information of the second device as a valid set, receive an original request from the first device, wherein the original request includes the first identifier and the first additional information associated with the first device, receiving a chasing request from the second device, wherein the chasing request includes the second identifier and the second additional information associated with the second device, determine whether the first device and the second device are the valid set based on the first identifier and first additional information in the original request and the second identifier and second additional information in the chasing request, and in response to determining that the first device and the second device are the valid set respond to the original request from the first device.

In certain embodiments, the first additional information can include encryption information of the first device and wherein the second additional information can include encryption information of the second device.

In certain embodiments, the encryption information of the first device can include one of a digital signature signed by a private key of the first device and a public key of the first device, and the encryption information of the second device can include one of a digital signature signed by a private key of the second device and a public key of the second device.

In certain embodiments, the one or more processors configured to determine whether the first device and the second device are the valid set can include one or more processors configured to determine whether the digital signature signed by the private key of the first device is valid using the public key of the first device, and determine whether the digital signature signed by the private key of the second device is valid using the public key of the second device.

In certain embodiments, the one or more processors configured to determine whether the first device and the second device are the valid set can include one or more processors configured to determine whether the first device and the second device are a valid pair based on the first identifier in the original request and the second identifier in the chasing request.

In certain embodiments, the one or more processors configured to determine whether the first device and the second device are the valid set can include one or more processors configured to determine whether content of the original request and content of the chasing request are match.

In certain embodiments, the one or more processors configured to determine whether the first device and the second device are the valid set can include one or more processors configured to determine whether a hash value of the original request and a hash value of the chasing request match.

In certain embodiments, the first identifier can include unique identification information that identifies the first device and the second identifier can include unique identification information that identifies the second device.

In certain embodiments, a method can include receiving, by a server, a request from a first device to register the first device and a second device as paired devices, the first device having a first identifier and the second device having a second identifier, storing the first identifier and the second identifier as a valid pair, receiving an original request and a chasing request from the second device, wherein the original request includes the first identifier associated with the first device and wherein the chasing request includes the second identifier associated with the second device, determining whether the first device and the second device are paired devices based on the first identifier in the original request and the second identifier in the chasing request, in response to determining that the first identifier in the original request and the second identifier in the chasing request match the stored valid pair, determining that the first device and the second device are paired devices, and responding to the original request.

In certain embodiments, the method can include, prior to the receiving the original request and the chasing request from the second device, sending, by the first device, the original request to the second device.

In certain embodiments, the first identifier can include unique identification information that identifies the first device and the second identifier can include unique identification information that identifies the second device.

Other embodiments are directed to systems, portable consumer devices, and computer readable media associated with the methods described herein.

A better understanding of the nature and advantages of the embodiments may be gained with reference to the following detailed description and the accompanying drawings.

BRIEF DESCRIPTION OF THE DRAWINGS

The disclosure will be readily understood by the following detailed description in conjunction with the accompanying drawings, wherein like reference numerals designate like elements, and in which.

DETAILED DESCRIPTION

Figure 1:
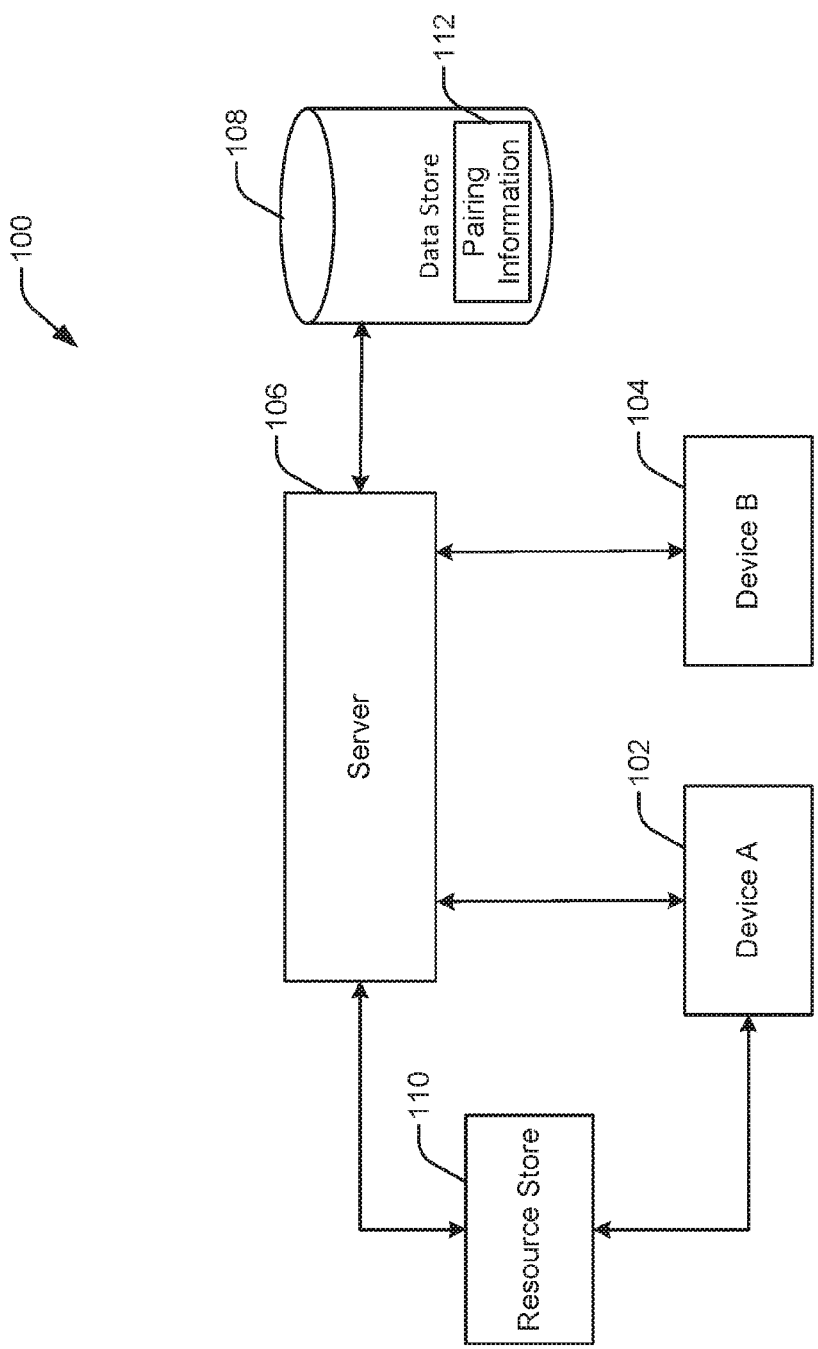
FIG. 1 illustrates a system for establishing a secure exchange of data to a device, in accordance with some embodiments.

In the following description, for the purposes of explanation, specific details are set forth in order to provide a thorough understanding of the embodiments. However, it will be apparent that various embodiments may be practiced without these specific details. For example, circuits, systems, algorithms, structures, techniques, networks, processes, and other components may be shown as components in block diagram form in order not to obscure the embodiments in unnecessary detail. The figures and description are not intended to be restrictive.

The present disclosure describes techniques (e.g., a system, a method, a memory or non-transitory computer readable medium storing code or instructions executable by one or more processors) for establishing secure data management in a cloud environment. For example, in certain embodiments, the secure data management techniques disclosed by the present disclosure can be used to securely exchange data in an Internet of Things (IoT) cloud environment. Certain embodiments are directed to techniques (e.g., a system, a method, a memory or non-transitory computer readable medium storing code or instructions executable by one or more processors) for secure data management.

In certain embodiments, a system is provided that enables multiple devices to be paired with each other and the pairing information is then subsequently used to determine whether or not requests received from the devices are to be granted. For example, a first device and a second device may be paired together. Subsequently, when the first device requests, for example, access to information managed by a server, it is determined whether the first device and the second device have been paired before the request can be granted. In some embodiments, additional checks, in addition to the pairing, may be used to determine whether the request from the first device should be granted.

The request (also referred to as the original request) received from the first device can be of various types. In certain embodiments, the original request may be a data exchange request requesting a data exchange operation between the first device and a data store. For example, the first device may use the original request to request access to a resource, such as a data resource, stored by a data store. As another example, the original request may be a request from the first device to download data (or other resource) from the first device to a resource/data store. In alternative embodiments, the original request may be some other kind of request.

In certain embodiments, processing is performed to determine whether the original request is to be granted or denied. In one embodiment, a server is configured to perform this processing. The server may be part of a security or authorization system. For example, the authorization system may control access to a resource stored in a resource store. In certain embodiments, the server receives an original request from a first device and a second request (referred to as the chasing request) from a second device that has been previously paired with the first device. Based upon the original and chasing requests, the server determines whether the first and second devices are part of a valid pair and grants the original request only upon determining that the first and second devices form a valid pre-registered pair. In certain embodiments, in addition to checking the valid pairing, additional checks may be performed before the original request is granted. For example, the server may determine whether certain information included in the chasing request matches with certain information in the original request, and grant the original request only after a match is confirmed.

Certain embodiments may enable devices to be pre-registered as paired devices and may grant a request for data from a device only when a same or similar request is received from its paired device(s). In some embodiments, two devices (or in some instances more than two devices) may register their identifiers and/or public keys with a server (such as a registration server or a pairing server) as part of the pairing process. One of the devices may be a device that does not have authentication capabilities such that if the device were to be stolen or hacked, an unauthorized user may gain access to data using the stolen or hacked device. In certain embodiments, when the devices are registered as paired devices, the device sending a request (e.g., the requesting device) to the server for access to an account or data may then request other paired device(s) to send a same or similar request to the server. The server may then grant the request (e.g. data exchange) when it has received the same or similar request from devices that were pre-registered or paired with the requesting device.

The teachings described in this disclosure can be applied to various kinds of computing devices and computing environments, including but not restricted to Internet of Things (IoT) devices and an IoT cloud environment. For example, an IoT cloud may need to be able to properly identify devices so as to provide secure data management where data uploaded by a device should be only accessible to that same device. Some conventional security systems distinguish devices based upon their unique device IDs. A device requesting information stored in the cloud may send a request to a cloud server requesting access to information stored by the cloud and include its device ID in the request. The access control system of the IoT cloud uses the received device ID to determine whether or not to grant the device access to the requested information. If the requesting device is stolen or hacked, the stolen or hacked device can still send its device ID to the IoT cloud and be able to gain unauthorized access to the stored information since the access control system of the cloud does not know that the device has been stolen or hacked. A similar problem applies to "copied" devices or "spoofed" devices where a fake device may access the data uploaded by a legitimate device if the fake device knows the ID of the legitimate device.

The device ID described above can come in various different forms. For example, in one embodiment, a device ID can include an Internet Protocol (IP) address or a MAC address of the device. In another embodiment, the device ID may be based upon a number generated by the device. In general, any kind of identifier that uniquely identifies a device can be used as the device's ID. An ID can include any information that is specific to the device and can therefore be used to identify the particular device. The ID of a device is generally includes information that is not typically known by other devices or users.

FIG. 1 illustrates a simplified block diagram of a system 100 for establishing a secure exchange of data to a device, in accordance with some embodiments. As shown in FIG. 1, the system 100 includes device A 102, device B 104, a server 106, a data store 108 and a resource store 110.

Device A 102 and device B 104 can be any type of computing device. A computing device may be of various different types, including, but not limited to a personal computer, a desktop, a mobile or handheld device such as a laptop, a mobile phone, a tablet, etc., and other types of devices. In some embodiments, a computing device can be a watch, a pedometer, a health wristband, an activity tracker of sorts, and the like. One of the computing devices A 102 and B 104 may be a device without an identification feature such that the device may continue to upload or access data from an unauthorized user after the device has been stolen.

Server 106 is configured to enable the secure exchange of a resource (e.g., data) between device A 102 and resource store 110. Server 106 may be part of a cloud environment, such as an IoT cloud. Server 106 can be, for example, a pairing server, a registration server, an authorization server, or combinations thereof. In certain embodiments, server 106 enables multiple devices to be paired. For example, server 106 can pair a first device with a second device. For example, server 106 may receive a request to pair device A 102 with device B 104 and cause the devices to be paired. In certain embodiments, server 106 may store information identifying the pairing of devices ("pairing information") 112 in a memory such as data store 108. For example, information indicative of the pairing of device A 102 with device B 104 may be stored in data store 108. Data store 108 may also store pairing information for various other pairings of devices in addition to the pairing information regarding device A 102 and device B 104. Data store 108 may also store other information used for the secure exchange of data such as other authorization information that is received from server 106. Data store 108 can be communicatively coupled to server 106, such as via a communication network (which may include wired or wireless links) or directly.

In addition to enabling pairing of devices, in certain embodiments, server 106 may also be configured to perform processing to authorize data exchange requests received from a device. For example, server 106 may be configured to authorize a data exchange request from device A 102 where the request requests download of data from device A 102 to resource store 110 or requests access by device A 102 to data stored by resource store 110. As part of this processing, server 106 may be configured to determine whether a device (e.g., device A 102) has been paired to another device (e.g., device B 104) and can only authorize a device (e.g., device A 102) that has been previously paired (i.e., previous to receiving the data exchange request) with another device (e.g. device B 104) to access a resource stored in resource store 110. Based upon the results of the authorization processing, server 106 may enable or prevent the data exchange requested by device A 102. Upon successful authorization, device A 102 may be permitted to access the requested resource. The access may be provided via server 106 or directly from resource store 110 to device A 102.

Resource store 110 can be of various types and can store various types of resources, including different types of data, that devices may want to access. For example, resource store 110 may be a non-volatile memory and the resources stored in resource store 110 can include various types of data that are stored in a cloud, such as an IoT cloud. In some embodiments, upon successful authorization, device A 102 may be permitted to access the requested resource. Resource store 110 can be communicatively coupled to server 106 and, in certain embodiments, to device A 102.

The embodiment depicted in FIG. 1 is merely an example and is not intended to unduly limit the embodiments. One of ordinary skill in the art would recognize many variations, alternatives, and modifications. For example, there can be more than two devices that are paired by server 106. Further, while only one server 106 is depicted in FIG. 1, in alternative embodiments, there may be multiple servers 106 controlling access to one or more resource stores. Resource store 110 can be coupled to other servers other than server 106 that can control access to the resource store 110 and any device, other than device A 102, may be configured to access the resources stored by resource store 110.

In certain embodiments, data exchange security is enhanced by enabling devices to be "paired" with each other and subsequently using the paring information to determine whether to grant a data exchange request from a first device by determining whether the first device has been previously paired with a second device. In certain embodiments, as part of the processing to determine whether to grant a data exchange request from a first device, in addition to the pairing information, additional information may be used to determine whether the data exchange request should be granted, such as whether the second device that has been paired with the first device is in a vicinity of the first device.

For example, as shown in FIG. 1, if device A 102 sends a data exchange request ("original request") to server 106 for a resource stored in resource store 110, the server 106 can receive information (referred to as a "chasing request" or "chasing information") from a second device (e.g., device B 104) that has been previously paired with device A 102. If the server 106 receives the information (e.g., chasing request) from device B 104 that was previously paired with device A 102, then the server may grant the request made by device A 102. For example, if device A 102 is requesting access to a resource stored by resource store 110, then server 106 may allow device A 102 to access the requested resource. If original request is for device A to download a resource (e.g., data) to resource store 110, then server 106 may allow the download to happen.

In certain embodiments, in addition to the pairing check, additional checks may be performed by server 106. For example, in some embodiments, server 106 may additionally determine whether device B 104 is within a specific vicinity of device A 102. If device B 104 is not within the specific vicinity of device A 102, then, even though server 106 may determine that device B 104 has been paired with device A 102, the data exchange may still not be granted.

In some embodiments, device A 102 may be paired with other devices, in addition to device B 104. In such an embodiment, if device B 104 is not within a vicinity of device A 102, then a device other than device B 104 that has previously been paired with device A 103 and that is within the vicinity of device A 102 may be used to determine whether the request (e.g. data exchange) by device A 102 should be granted.

Different techniques may be used to determine whether device B 104 is within a specific vicinity of device A 102. According to one technique, if a Bluetooth Low Energy (BLE) connection is being used to make a notification from device A 102 to device B 104, device B 104 can be in a vicinity of device A 102 if device B 104 is within a range of BLE. Similar methods can be used with any other short-range wireless communication method in order to determine whether devices are within a vicinity of each other.

In certain embodiments, after the original data exchange request has been sent by device A 102 to the server 106, device B 104, which has previously been paired with device A 102, may be informed of the original data exchange request. Right after device A 102 sends an original request to the server 106, the second device B 104 sends a chasing request to the server 106 in order for the original request to be accepted by the server 106. For example, device A 102 may send a notification to device B 104 about the original data exchange request. There are different ways in which such a notification may be communicated from device A 102 to device B 104. In certain embodiments, device A 102 and device B 104 may be communicatively paired or coupled such as via a Bluetooth Low Energy (BLE) connection and the notification may be communicated from device A 102 to device B 104 via this connection. The two devices can also be paired in many other ways. For example, some embodiments can encrypt with two secrets (e.g., secret key encryption). Some embodiments may link a device with only BLE with a hub that provides the internet connection. The IoT Cloud only allows the device to access the IoT Cloud via the hub. In some embodiments, a mobile phone/application can serve as the hub. Some embodiments may link user authentication mechanisms with a mobile app.

In certain embodiments, device A 102 may send the original data exchange request to server 106 and also to device B 104. Upon receiving the request from device A 102, device B 104 may then send another request (chasing request) to the server 106, where the chasing request includes the original request received by device B 104 from device A 102, or a portion thereof. Upon receiving the original request from device A 102 and the chasing request from device b 104, server 106 is configured to determine whether device A 102 and device B 104 have been pre-registered as a valid pair and further whether the original request received from device A 102 matches or is similar to the request in the chasing request received from device B 104. Once server 106 confirms that the requests (i.e., the original request and the chasing request) from device A 102 and device B 104 are from validly paired devices and are the same or similar, then server 106 may grant the original data exchange request received from device A 102. If one of the devices is stolen or copied by a malicious user in this system, if device A 102 were to send a request, the paired device, device B 104, would not be able to send the same or similar request and the server 106 would not grant the request. This enables the overall system to be secured even when a device has been compromised.

The system is secure since an improper user (e.g. thief) cannot misuse device A 102 even though device A 102 is improperly used (e.g. stolen). All requests sent from device A 102 need to have the corresponding chasing requests from device B 104. Otherwise, server 106 will not accept the requests. Further, even if, for example, device A 102 is stolen, when the connection between device A and B is made with a short-range wireless connection (e.g., BLE), an improper user would need to have both device A 102 and device B 104 at the same time in order to use device A 102. Also, identifying a paired device is not easy for an improper user to perform. For example, there can be many devices in a home and only the legitimate user who has paired the devices may know which device is, for example, "device B 104".

As indicated above, the devices that are part of a valid pair have to be paired together with server 106 before any original data exchange request is received from any one of the devices. When registering a first device (e.g., Device A 102) to the IoT cloud (e.g., with server 106 in the IoT cloud), a second device (e.g., Device B 104) can also be registered as its pair. The IoT cloud can then remember and store identification information for the devices, such as an ID's of the devices or hash values generated from information received from the devices, for example, ID's of device A 102 and device B 104. Device A 102 and device B 104 can then be paired by server 106 and the pairing information 112 stored by ever 106 in data store 108. Subsequent to the pairing, device A 102 may send an original request to the IoT cloud (e.g., to server 106 in the cloud), and the device A's ID may be included in the request. Device A 102 can be called a requesting device since it is the device that is sending the original data exchange request, which may either request a resource stored by resource store 110 and/or may request a resource to be downloaded from device A 102 and be stored in resource store 110.

Device A 102 may notify device B 104 that it has sent an original request to the Cloud. The notification may be sent to device B 104 via a communication channel such as via BLE. Device B 104 may then send a chasing request to the Cloud (i.e., to server 106) with its ID. The request sent by device B is referred to as a "chasing request" since it follows or chases the original request sent by the first device. The terms original request or chasing request have been coined only for purposes of clarification and are not intended to limit the scope of claimed inventive embodiments. Device B 104 can be called a responding device since it is responding to the original request made by device A 102. Server 106 in the Cloud may check the original and chasing requests to see if they are received from validly paired devices as part of determining whether or not to grant the original request made by device A 102. In some embodiments, server 106 may additionally check if the chasing request matches the original request as part of determining whether or not to grant the original request made by device A 102. The additional request adds an additional layer of security to the authorization process. In alternative embodiments, additional layers of security may be added by adding additional checks (e.g., a vicinity check).

In the manner described above, in certain embodiments, information from two separate devices (the requesting device and the responding device) is used to determine whether a data exchange request from a requesting device is to be authorized. The authorization procedure uses information (e.g., pairing information) that has been registered prior to receiving the original data exchange request. Although in the examples discussed above the first device is identified as the requesting device and the second device is identified as a responding device, this is merely an example. Once two (or more) devices have been paired, any of the paired devices can act as a requesting device and one or more of the other paired devices can act as responding devices. For example, for paired devices A 102 and B 104, in one instance, device A 102 may be the requesting device and device B 104 may be the responding device. In another instance, device B 104 may be the requesting device and device A 102 may be the responding device. Further, certain embodiments can include devices in addition to device A 102 and device B 104.

Figure 2:
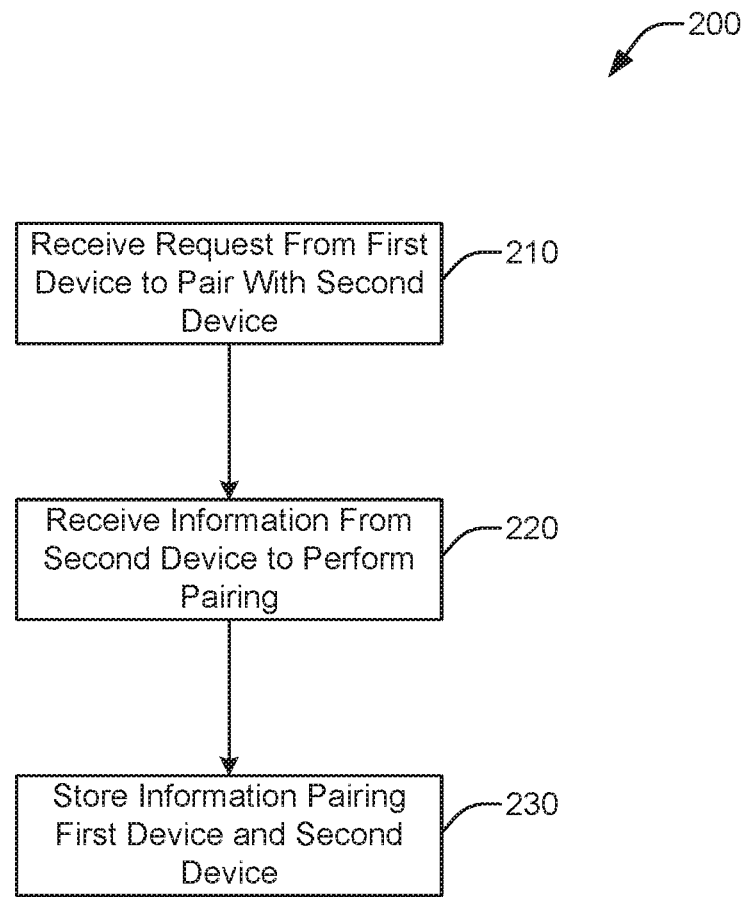
FIG. 2 illustrates a flow diagram for pairing devices, in accordance with some embodiments.

FIG. 2 illustrates a flow diagram of a method 200 for pairing devices, in accordance with some embodiments. As shown in FIG. 2, at 210, a server (e.g., server 106) can receive a request from a first device (e.g. device A 102) to be paired with a second device (e.g. device B 104). As part of the request in 210, the first device can provide its identification information (e.g., an ID or a hash value) and request that it be paired with a second device. At 220, the server can receive identification information (e.g. an ID or hash value) from the second device (e.g., device B 104) that is needed in order to perform the pairing.

There are various ways by which the second device knows that it needs to send information to the server as part of 220. In certain embodiments, the first device can ask the second device to send the pairing information of the second device to the server. For example, after the first device has sent a request per 210 to the server to be paired with a second device, the first device can also send a request to the second device asking the second device to send its pairing information to the server. When the first device requests the second device to send its pairing information to the server, this request can be made independent of the server. That is, the first device may request the second device to send its pairing information without any prompting from the server.

In an alternative embodiment, after the server has received the request from the first device per 210 to pair with a second device, the request received in 210 may identify the second device that is to be paired with the first device. The server itself may then request the second device to provide information for pairing with the second device with the first device. Therefore, there are various ways by which the second device knows to send its pairing information to the server.

In certain embodiments, a predetermined period of time (e.g. minutes, hours, days) can be set within which the server has to get pairing information from the second device per 220. The predetermined period of time can be preconfigured by a user of the server. For example, the predetermined period of time can be a period of time during which a second device would reasonably reply to the request for pairing information made by the first device. In the event that the pairing information is not received by the server from a second device within the predetermined amount of time, then the pairing may not be performed and the request received from the first device in 210 to pair with a second device maybe declined.

In one embodiment, the period of time may be measured from the time the server receives the request from the first device in 210. In an embodiment where the server sends a notification to the second device requesting the pairing information, the period of time may be measured from the time the server sends the notification to the second device. At 230, the server can store the information received from the first device and from the second device as pairing information in a data store (e.g., as pairing information 112 in data store 108). The pairing information may indicate that the first device and second device are identified as a valid pair.

At 230, the server can store the information received from the first device and from the second device as pairing information in a data store (e.g., as pairing information 112 in data store 108). The pairing information may indicate that the first device and second device are identified as a valid pair.

The processing depicted in FIG. 2 and described above is only meant as an example and is not meant to be restrictive. For example, in alternative embodiments, more than two devices can be paired together. For example, a first device, a second device, a third device, and the like, can be paired together forming a paired set of multiple devices.

Figure 3:
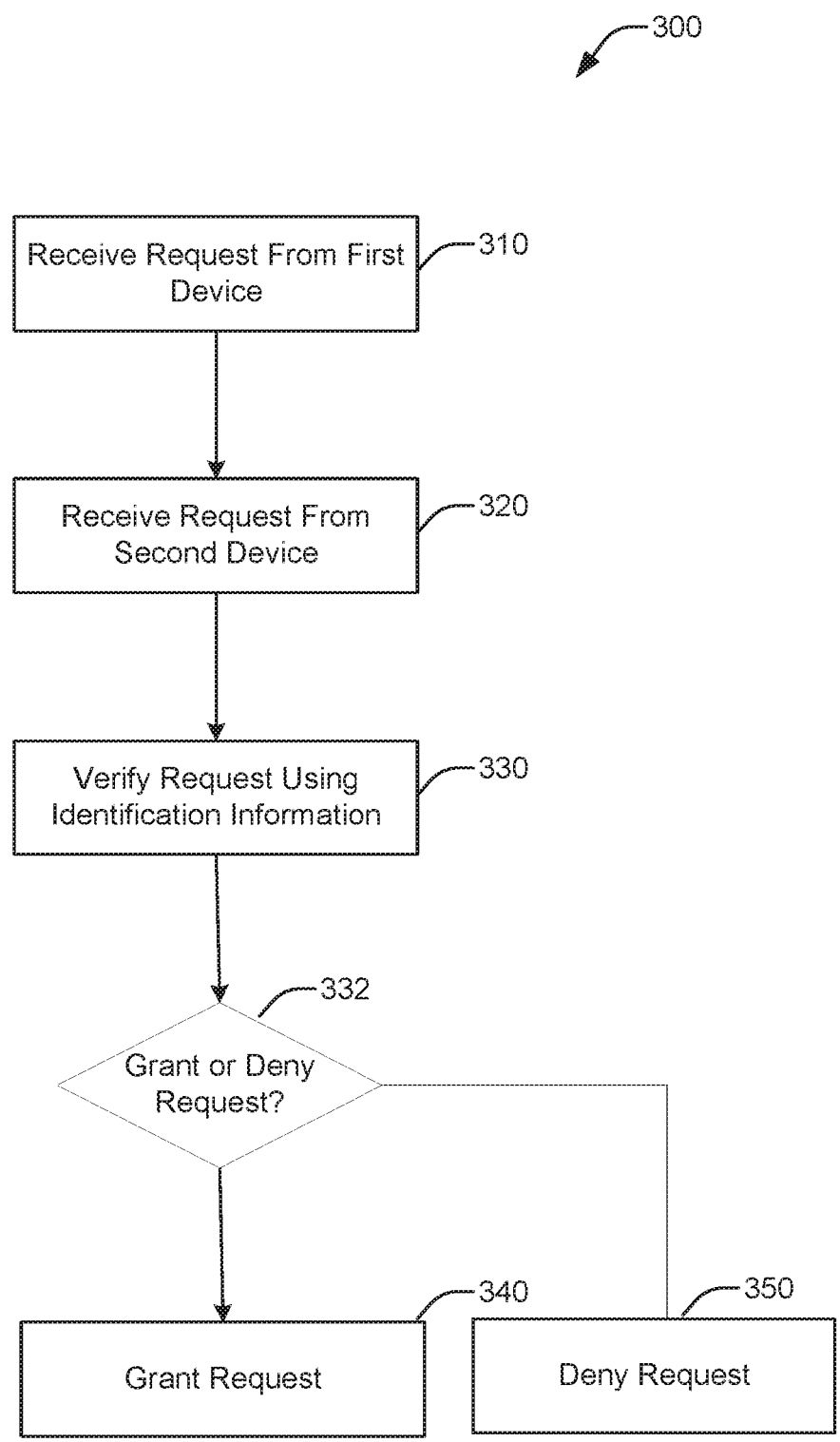
FIG. 3 illustrates a flow diagram for authorizing data access to a paired device using identification information, in accordance with some embodiments.

After the devices have been paired, the pairing information can be used to determine whether or not to grant a request received from one of the paired devices. FIG. 3 illustrates a flow diagram of a method 300 for authorizing a request from a device using previously registered pairing information, in accordance with some embodiments. FIG. 3 illustrates a method for fulfilling a request from a device upon receiving an original request and a chasing request from devices that are a valid pair. Method 300 can be performed by server device such as server 106 depicted in FIG. 1.

Some or all of method (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a non-transitory computer-readable storage medium, for example, on a memory device in the form of a computer program to be executed by processing unit(s), such as a browser application.

At 310, a server (e.g., server 106) can receive a request (original request) from a first device (e.g., device A 102). The original request may be, for example, a data exchange request requesting access by the first device to a resource (e.g., data) stored by a resource store such as resource store 110 depicted in FIG. 1. Since the first device is sending the original request, the first device can also be called the requesting device. At 320, the server receives a request (chasing request) from the second device (e.g., device B 104). Since the second device is sending a chasing request (e.g. a response to the original request), the second device can also be called the responding device.

In certain embodiments, the first device can ask the second device to send the chasing request. For example, after the first device has sent the original request to the server, the first device can also send a notification to the second device asking the second device to send its chasing information to the server. When the first device requests the second device to send information to the server, this request can be made independent of the server, i.e., without any prompting from the server.

In an alternative embodiment, after the server has received the original request from the first device, the server itself may send a notification to the second device requesting the second device to provide the chasing request. Therefore, there are various ways by which the second device knows to send the chasing request in 320.

In some instances, a request from the second device per 320 may never be received by the server. In such instances, the original request received from the first device in 310 is denied and processing ends. In certain embodiments, a predetermined period of time (e.g. minutes, hours, days) can be set within which the server has to get the chasing request from the second device. This predetermined period of time can be preconfigured by a user of the server. For example, the predetermined period of time can be a period of time during which a second device would reasonably reply with the chasing request. In the event that the chasing request is not received by the server from the second device within the predetermined amount of time, then the original request is denied and processing ends. In one embodiment, the period of time may be measured from the time the server receives the original request from the first device in 310. In an embodiment where the server sends a notification to the second device requesting the second device to send the chasing request, the period of time may be measured from the time the server sends the notification to the second device.

Assuming that a chasing request is received by the server within the pre-determined time period, at 330, the server performs processing to determine whether the original request from the first device received in 310 should be granted or denied. In one embodiment, the determination is made based upon whether the first device and the second device are pre-registered as a valid pair based upon pairing information accessible to the server. For example, the determination as to whether the requests are received from a valid pair of devices can be based on unique identification information (e.g., ID number) of the devices that was provided during pairing. The server can determine whether a chasing request from a second device that is a valid pair with the first device has been received. If the server determines, based upon the pairing information, that the first and second devices form a valid pair, then the original request may be granted.

Accordingly, based upon the processing performed in 330, in 332, it is determined whether to grant the original request or to deny it. If it is determined in 332 that the request is to be granted, then in 340, the request is granted. For example, if the original request was for the first device requesting access to a resource, then that access is granted. If it is determined in 332 that the request is to be denied, for example, because a valid paring was not found in 330, then in 350, the request is denied. For example, if the original request was for the first device requesting access to a resource, then that access is denied.

In certain embodiments, as part of the processing in 330, in addition to checking the valid pairing, additional checks may be performed by the server to determine whether or not to grant the original request. For example, in certain embodiments, when the first device sends the original request to the server, the first device may also send information regarding the original request to the second device. This information may be the first request itself or a portion thereof. This second device may then include this information (the first request or a portion thereof) in the chasing request that is received by the server in 320. In such an embodiment, as part of the processing in 330, in addition to checking the valid pairing, the server may be configured to check whether a portion of the chasing request received in 320 by the server (where the portion could be the original request information or a portion thereof) from the second device matches a portion of the original request information received in 310 by the server from the first device. If a match is found and the first and second devices are determined to form a valid pair, then the original request is granted per 340. If either a valid match is not found or that a portion of the chasing request information received in 320 by the server does not match a portion the original request information received in 310 by the server, then the original request is denied in 350.

Figure 4:
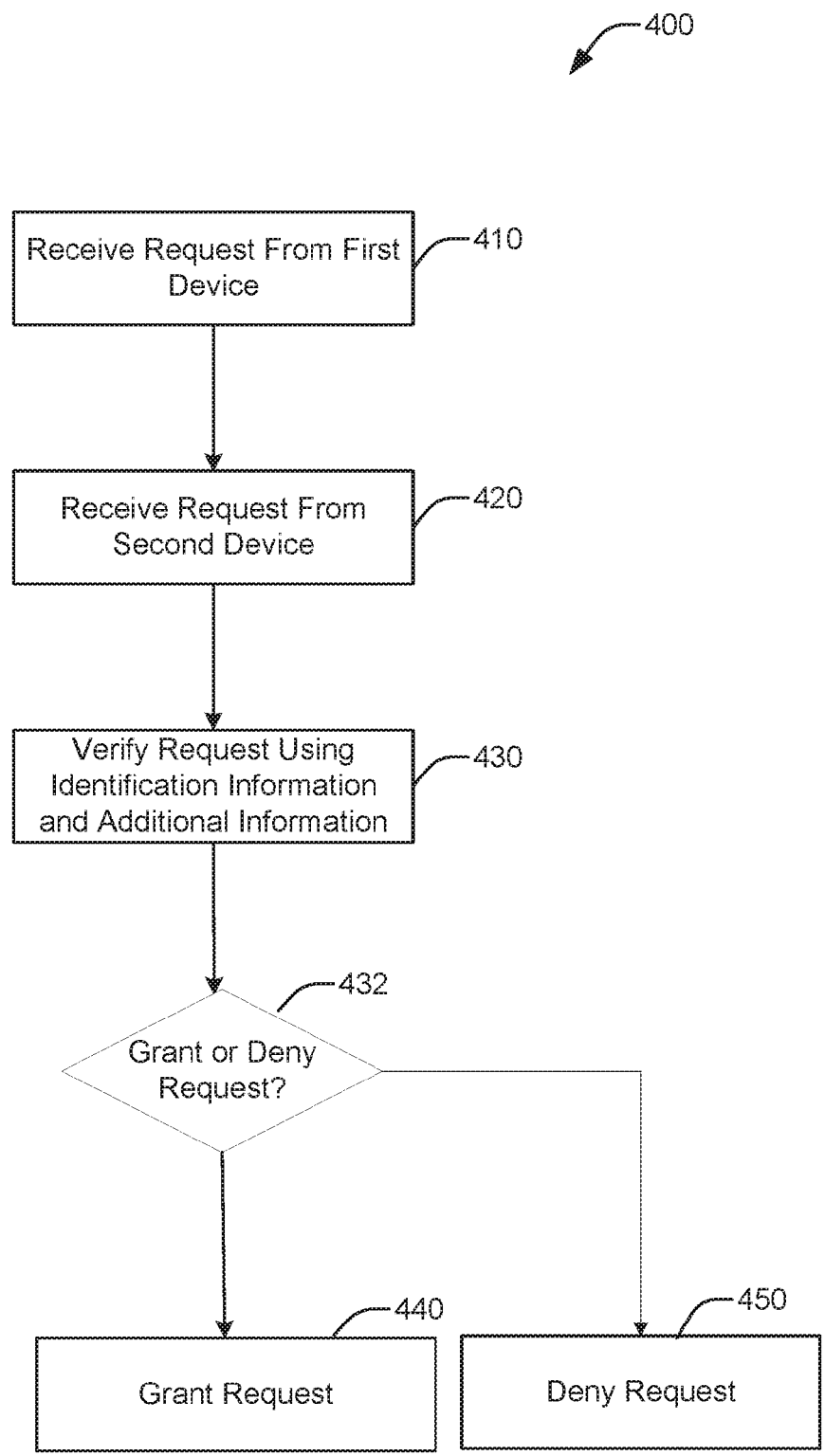
FIG. 4 illustrates a flow diagram for authorizing data access to a paired device using identification information and additional information, in accordance with some embodiments.

FIG. 4 illustrates a flow diagram of a method 400 for authorizing data access to a paired device using identification information and additional information, in accordance with some embodiments. The operations of FIG. 4 are similar to that of FIG. 3, however the verification of the requests takes into account the identification information of the devices as well as additional information.

At 410, the server (e.g. server 106) can receive a request from a first device (e.g. device A 102) requesting information for a resource (e.g. a resource stored in resource store 110). Since the first device is sending the original request, the first device can also be called the requesting device. At 420, the server receives a request from the second device (e.g. device B 104). Since the second device is sending a chasing request (e.g. a response to the original request), the second device can also be called the responding device. The first device can ask the second device to send the chasing request.

Assuming that a chasing request is received by the server within the pre-determined time period, at 430, the server performs processing to determine whether the original request from the first device received in 410 should be granted or denied. In one embodiment, the determination is made based upon whether the first device and the second device are pre-registered as a valid pair based upon pairing information accessible to the server. For example, the determination as to whether the requests are received from a valid pair of devices can be based on unique identification information (e.g., ID number) of the devices that was provided during pairing. The request for pairing can also include additional information, for example, the request itself, private key information, public key information, etc. The server can determine whether a chasing request from a second device that is a valid pair with the first device has been received. If the server determines, based upon the pairing information, that the first and second devices form a valid pair, then the original request may be granted.

Accordingly, based upon the processing performed in 430, in 432, it is determined whether to grant the original request or to deny it. If it is determined in 432 that the request is to be granted, then in 440, the request is granted. For example, if the original request was for the first device requesting access to a resource, then that access is granted. If it is determined in 432 that the request is to be denied, for example, because a valid pairing was not found in 430, then in 450, the request is denied. For example, if the original request was for the first device requesting access to a resource, then that access is denied.

In certain embodiments, as part of the processing in 430, in addition to checking the valid pairing, additional checks may be performed by the server to determine whether or not to grant the original request. For example, in certain embodiments, when the first device sends the original request to the server, the first device may also send information regarding the original request to the second device. This information may be the first request itself or a portion thereof. This second device may then include this information (the first request or a portion thereof) in the chasing request that is received by the server in 420. In such an embodiment, as part of the processing in 430, in addition to checking the valid pairing, the server may be configured to check whether a portion of the chasing request received in 420 by the server (where the portion could be the original request information or a portion thereof) from the second device matches a portion of the original request information received in 410 by the server from the first device. If a match is found and the first and second devices are determined to form a valid pair, then the original request is granted per 440. If either a valid match is not found or that a portion of the chasing request information received in 420 by the server does not match a portion the original request information received in 410 by the server, then the original request is denied in 450.

Figure 5:
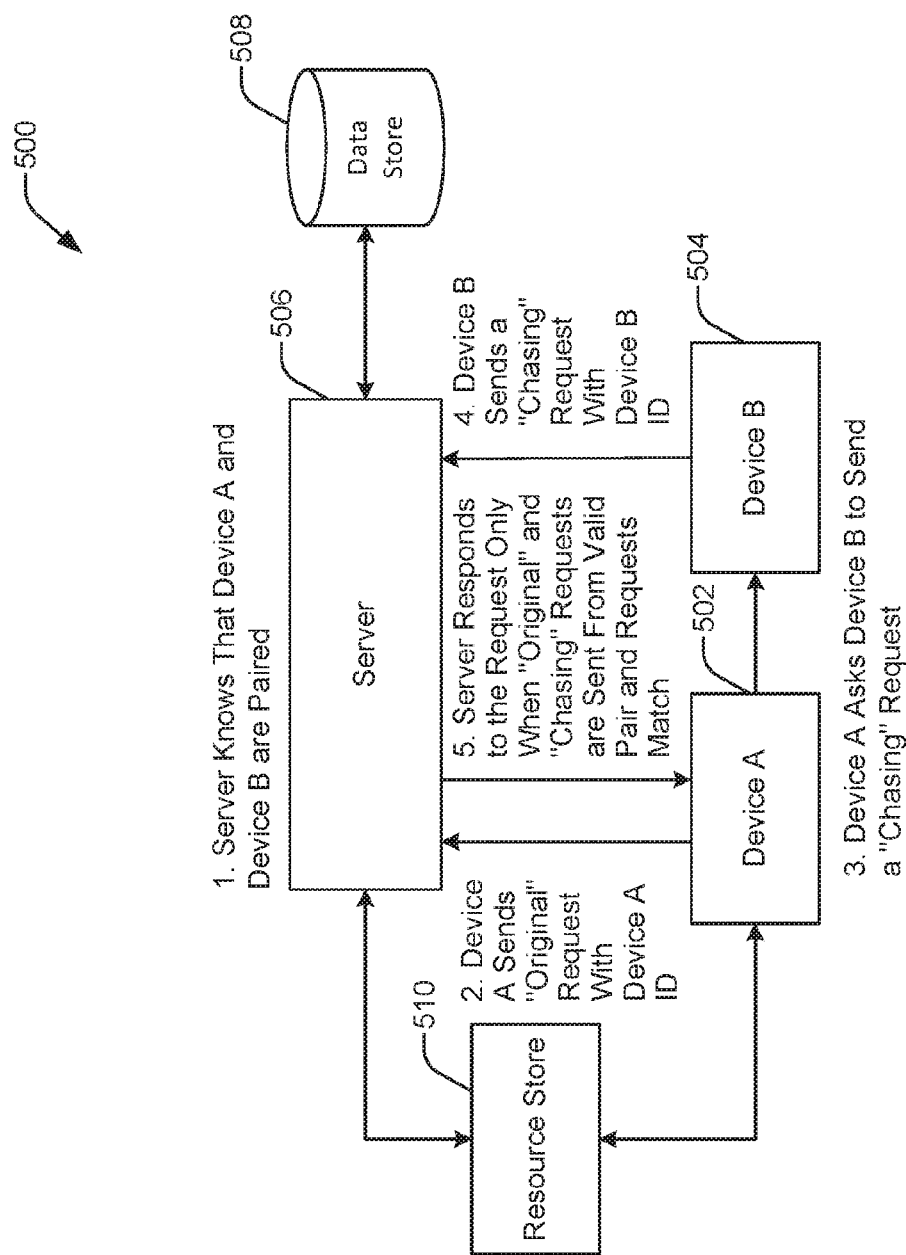
FIG. 5 illustrates a block diagram of a computing environment in accordance with some embodiments.

FIG. 5 illustrates a block diagram of a computing environment 500 in accordance with some embodiments. Computing environment 500 can be similar to the computing environment shown in FIG. 1. Further, the elements of computing environment 500 can perform s similar to the elements of computing environment 100. Computing environment 500 can include a plurality of computing devices such as device A 502 and device B 504 and one or more servers including server 506. The plurality of computing devices can be communicatively coupled to the one or more servers via a communication network.

The embodiment depicted in FIG. 5 is merely an example and is not intended to unduly limit the embodiments. One of ordinary skill in the art would recognize many variations, alternatives, and modifications.

Server 506 can receive requests and perform actions (e.g., serve content) in response thereto. Additional servers for receiving requests and performing actions can be provided. As shown in FIG. 5, at 1, the server 506 knows that devices are paired. For example, the server 506 can know that device A 502 and device B 504 are paired.

A user of device A 502 and a user of device B 504 may both access the server 506 and register their devices as paired devices. In some embodiments, the devices register their devices as paired devices by submitting an identifier associated with each device. Server 506 may then know that devices A 502 and B 504 are paired. In some embodiments, server 506 stores the paired device identifiers in a storage device. The pairing can be performed as described in FIG. 2.

At 2, device A 502 sends an original request with its ID information to server 506. Device A 502 can send an original request with the identifier of device A 502. Device A 502 may be requesting data or content stored on the Cloud.

At 3, device A 502 asks device B 504 to send a chasing request. At 4, device B 504 sends a chasing request along its ID information to server 506. Device B 504 may send a chasing request with the identifier of device B 504 to server 506. At 5, server 506 responds to the original request made by device A 502 only when the server determines that device A 502 and device B 504 have been previously paired and the original request sent by device A 502 and the chasing request sent by device B 503 match. Upon verifying that the original request and the chasing request are sent from a valid pair, server 506 may respond to the request made by device.

In some embodiments, server 506 can provide access control services in cooperation with one or more data stores and is able to generate content such as text, graphics, audio, and/or video to be delivered to the user. In certain embodiments, server 506 can receive data such as pairing information from computing devices (e.g., computing devices A 502 and B 504) where pairing information indicates the devices that would like to be paired with each other. Server 506 may also receive pairing information for devices that have indicated they should be paired in order to perform later verification. Data store 508 can store information such as pairing information (e.g. valid pair and/or valid set information).

Computing environment 500 can also include one or more data stores (e.g. data store 508) that can store pairing information and that can be accessible by server 506 to retrieve pairing information. A data store 508 can include any device or combination of devices capable of storing, accessing and retrieving data, which may include any combination and number of memories, data servers, databases, data storage devices and data storage media, in any standard, distributed, or clustered environment. Server 506 can include any appropriate hardware and software for integrating with data store as needed to execute aspects of one or more applications for the client device and handling a majority of the data access and business logic for an application.

In the illustrated embodiment, device A 502 and device B 504 can communicate using a Bluetooth radio communication standard. The Bluetooth standard can provide short distance (e.g., 10-15 meters), low power (e.g., 100 mW), two-way radio communication of data among suitable equipped wireless communication devices. Other local radio communication technology may be substituted to provide the local radio links between device A 502 and device B 504. This includes equipment such as wireless local area network (LAN) equipment, Hyper-LAN equipment, and equipment according to IEEE standard 802.11. Alternatively, non-radio communication technology may be used to provide such communication links, such as infrared data communication.

Some embodiments may register two devices (or in some instances, more than two devices) as a pair with a server. Although two devices are shown as being paired, several devices can be paired and communicate with each other. For example, more than one device can act as a responding device to a requesting device if several devices are paired with the requesting device. Therefore, the same principles can be applied to multiple devices.

Figure 6:
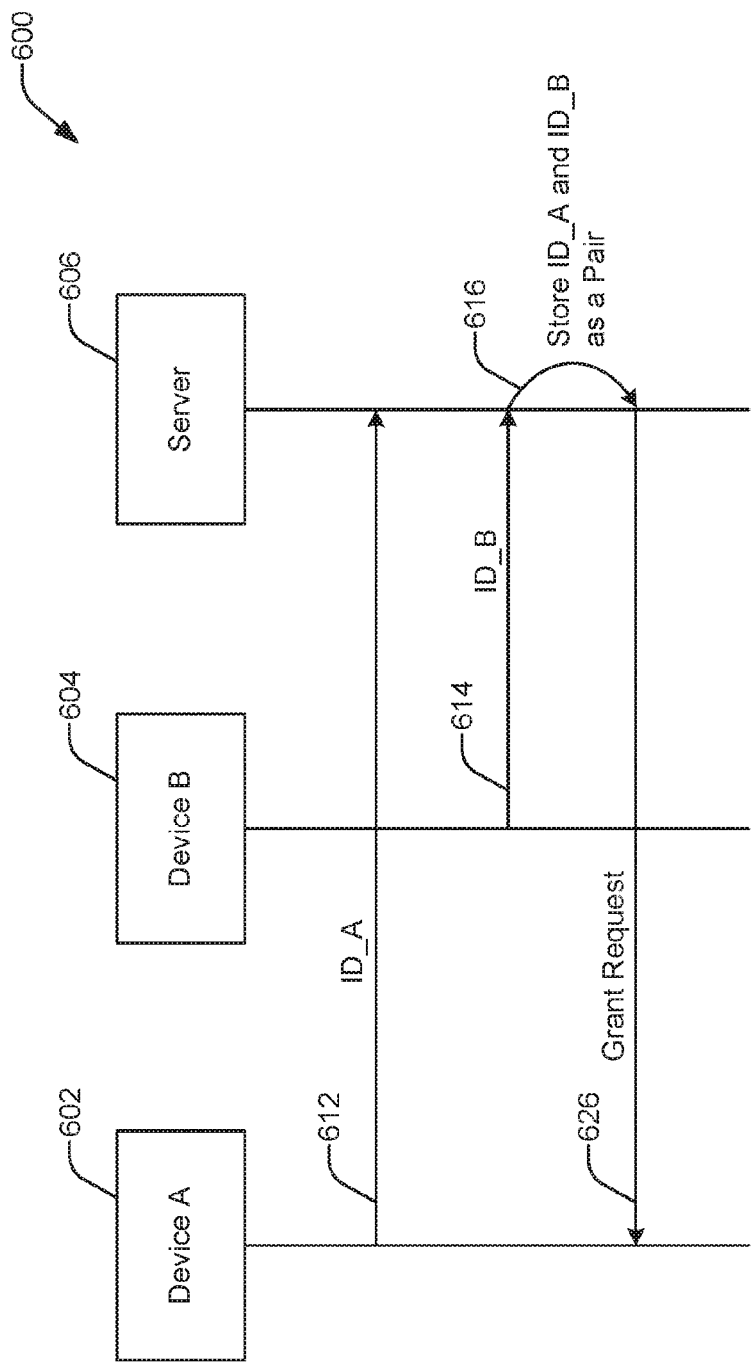
FIG. 6 illustrates an example of device registration in accordance with some embodiments.

FIG. 6 illustrates an example of a method 600 for performing device registration in accordance with some embodiments. In 612, device A 602 may send a request to server 606 to be registered as a pair with another device, in this instance, device B 604. In 614, device B 604 may subsequently send a request for pairing to the server 606. Upon receiving the requests for pairing from the two devices, the server 606 may store the identifier for device A 602 and the identifier for device B 604 as a pair. At 626, the server 606 may then grant the request for device A 602 and device B 604 to be registered as a pair.

Figure 7:
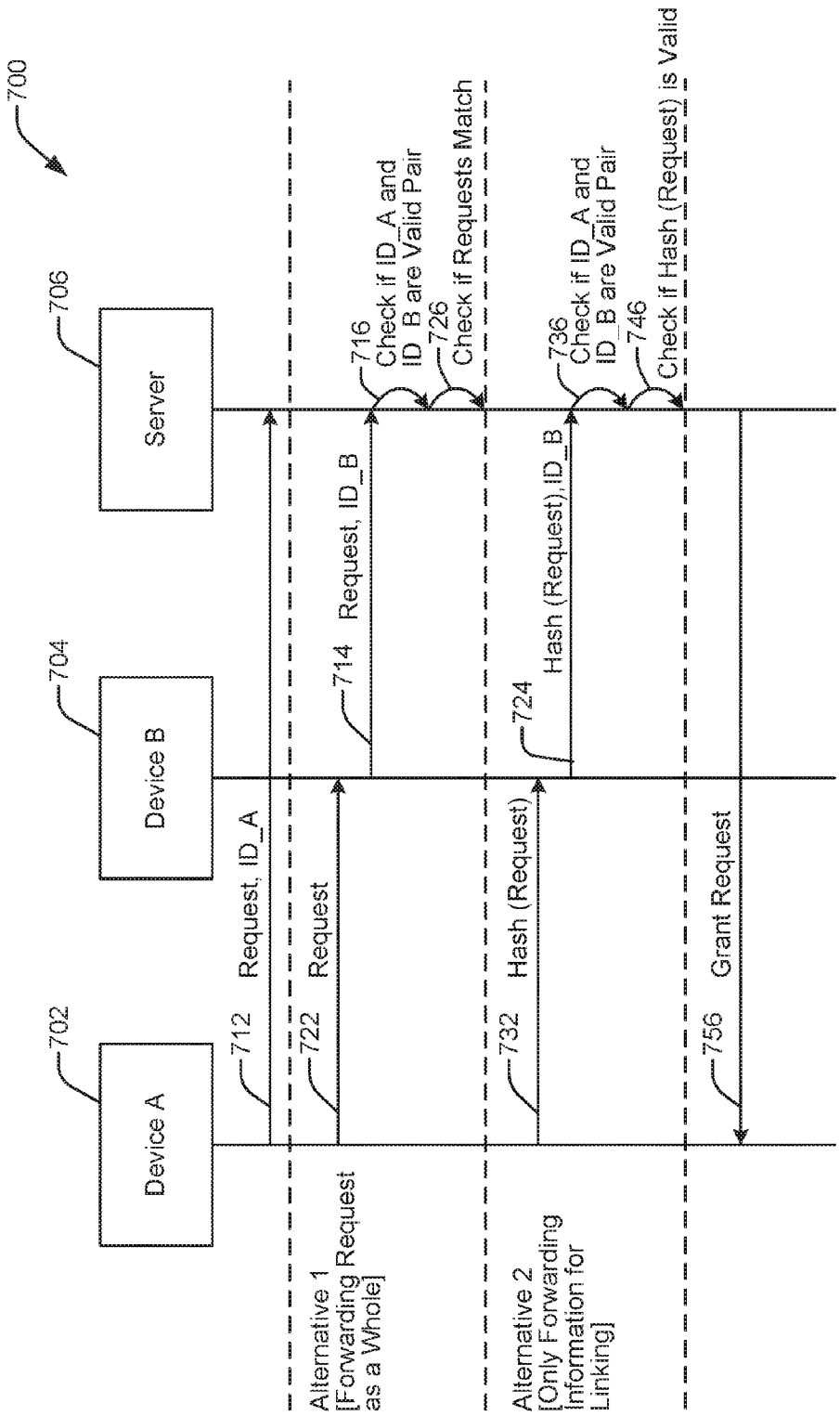
FIG. 7 illustrates an example of authorizing a request in accordance with some embodiments.

Certain embodiments may determine whether requests (e.g. data exchange) have been received from paired devices before authorizing a transaction request from a device. FIG. 7 illustrates an example of a method 700 for authorizing a request (e.g. data exchange) in accordance with some embodiments. At 712, device A 702 may send a request to a server 706. The request can be a request for data or a request to perform one or more actions (e.g., uploading information to an account associated with a user of device A 702). device A 702 may also forward its identification information (e.g. unique identifier) to server 706 for the server 706 to determine whether it has received another device identifier for another device that is paired with device A 702. If server 706 has received a device identifier for another device that is paired with device A 702, server 706 may fulfill the request from device A 702. In this example, server 706 can be identified as an authorization server since it is determining whether device A 702 is authorized to access data.

In 722, device A 702 may send a message to other devices, such as device B 704, with which device A 702 is paired, in order to trigger those other devices to send another request to the server 706. The other request can be a similar or identical request to the initial request sent by the requesting device, in this instance device A 702. As shown in FIG. 7, subsequent to sending the request to the server 706, device A 702 sends a message to device B 704 to cause device B 704 to send a request to the server 706. In 714, device B 704 may also forward its identifier to the server 706 and can also forward a request. The request sent from device B 704 to the server 706 can be a forwarded request of the request received from device A 702 sent along with the identifier of device B 704.

At 716, server 706 may determine whether to authorize the request made by device A 702 by checking whether the received identifiers from device A 702 and device B 704 are a valid pair. That is, the server 706 can determine whether the identifier of device A 702 and the identifier of device B 704 are stored as a valid pair in a data store (e.g. data store 108). In 726, server 706 can also check if the requests from device A 704 and device B 704 match. In certain embodiments, the server 706 may authorize the request upon determining that identifiers of a valid pair have been received and that the requests are identical or in some instance, similar. In some embodiments, the requests can be determined to be identical or similar when the data being requested is the same and/or when the requestor of the data is the same.

Different embodiments may use different identifiers that may be used by server 706 for matching the two requests. As shown in the bottom half of FIG. 7, device A 702 and device B 704 may send an identifier that server 706 can use for matching the two requests. This example uses hash(request) as the identifier. Other types of identifiers may also be used so long as server 706 can use the identifiers to match the requests received from device A 702 and device B 704. At 732, after device A 702 sends a request to server 706 (at 712), device A 702 may forward a hash(request) or other identifier to device B 704. Device B 704 may then forward the received hash(request) to server 706 along with identification information (e.g. a unique identifier) of device B.

The server 706 may then grant the request upon determining that one or more conditions are satisfied. In 736, server 706 may check if the identifier from which the initial request was received, in this instance device A 702, and the identifier from which the secondary request was received, in this instance device B 704, are a valid pair. In some embodiments, the server 706 may access one or more data stores that may store pairing information to make this determination.

At 746, the server 706 may also check if the requests received from the two devices match. In certain embodiments, the server 706 may calculate hash(request) from the request sent by device A 702 and determine whether the hash(request) matches with hash(request) sent by device B 704. The request itself or the hash of the request that is sent can be, for example, runtime information. That is, information that is being received by the server 706 during runtime. Therefore, information other than the ID of the devices can be used to determine whether a request made by the first device should be granted. Upon determining that both conditions are satisfied (e.g. valid pair and hash(request) match), at 756, the server 706 may grant the request.

Figure 8:
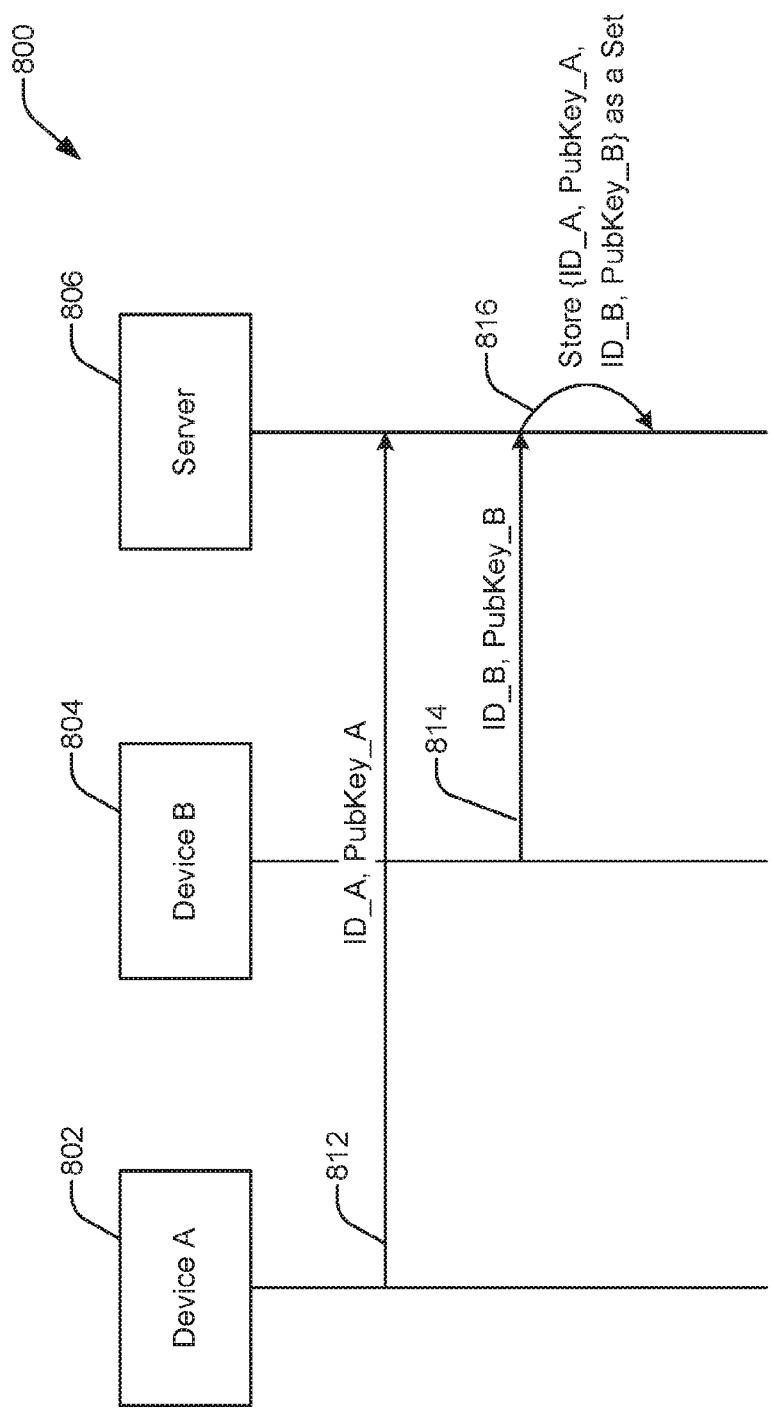
FIG. 8 illustrates an example of device registration where public keys of devices are registered along with device identifiers in accordance with certain embodiments.

Certain embodiments may increase the security by utilizing public key cryptography. In some embodiments, the security enhancement may be achieved with a combination of public keys and digital signatures signed by private keys. FIG. 8 illustrates an example of a method 800 of performing device registration where public keys of devices are registered along with device identifiers in accordance with certain embodiments.

As shown in FIG. 8, the public keys of device A 802 and device B 804 can be pre-registered with the server 806 and later used for validating the signatures. In 812, device A 802 can send its public key along with its identifier (e.g. ID_A) when registering the pairing information with device B 804. In 814, device B 804 may also send its public key along with its identifier (e.g. ID_B) to server 806. Server 806 can also be called a pairing server since it can be used to pair a first device (e.g. device A 802) with a second device (e.g. device B 804). In 816, the server 806 may then store the identifier and public key of device A 802 with the identifier and public key of device B 804 as a set. The public keys of device A 802 and device B 804, which have been registered, can later be used for validating signatures of the devices.

Figure 9:
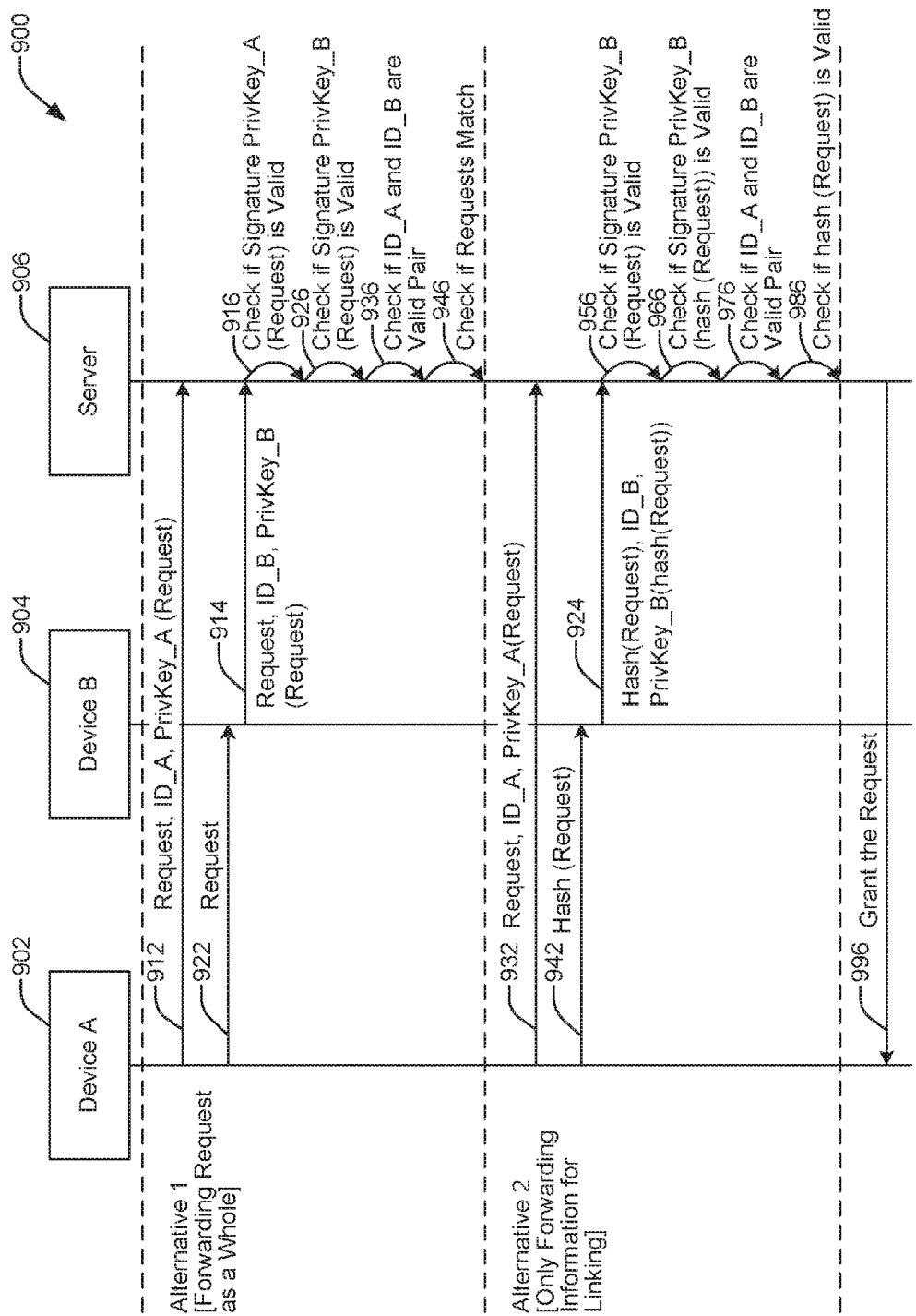
FIG. 9 illustrates another example of authorizing the request in accordance with certain embodiments.

FIG. 9 illustrates another example of a method 900 of authorizing a request (e.g. data exchange) in accordance with certain embodiments. As shown in FIG. 9, in 912 device A 902 sends a digital signature of the request (e.g. PrivKey_A(Request)) created with the private key of device A 902 along with a request to server 906. In some embodiments, device A 902 also sends its identifier to server 906. In 922, device A 902 may forward its request to device B 904. In 914, device B 904 may send a digital signature of the request (e.g. PrivKey_B(Request)) created with the private key of device B 904 along with the request to the server 906 in response to receiving the forwarded request from device A 902. Upon receiving the requests from device A 902 and device B 904, server 906 may determine whether a number of conditions are satisfied before granting the request.

In this example, server 906 may validate the signatures to ensure that the requests are indeed coming from device A 902 and device B 904. At 916, server 906 may check if the signature PrivKey_A(Request) is valid by using the public key of device A 902. At 926, server 906 may check if the signature PrivKey_B(Request) is valid by using the public key of device B 904. At 936, server 906 may also check if the identifier from device A 902 and the identifier from device B 904 are a valid pair. In 946, server 906 may also check if the requests from device A 902 and device B 904 are the same or similar.

Some embodiments may forward the information for linking instead of forwarding the request as a whole. Again, certain embodiments may use different identifiers that may be used by server 906 for matching the two requests while sending the digital signatures along with the requests. Device B 904 may send an identifier that the server 906 can use for matching two requests. This example uses hash (request) as the identifier.

In 932, device A 902 sends a digital signature of the request created with the private key of device A 902 along with a request to server 906. In some embodiments, device A 902 also sends its identifier to server 906. In 942, device A 902 may forward hash(request) to device B 904. In 924, device B 904 may send a digital signature of the hash (request) created with the private key of device B 904 along with the hash (request) to the server 906 in response to receiving the forwarded hash(request) from device A 902. Upon receiving the requests from device A 902 and device B 904, server 906 may determine whether a number of conditions are satisfied before granting the request.

As shown in the bottom half of FIG. 9, in 956, the server 906 checks if the signature PrivKey_A(Request) is valid using the public key of device A. In 966, the server 906 checks if signature PrivKey_B(hash(Request)) is valid using the public key of device B. In 976, server 906 also checks if the identifier from device A and the identifier from device B are a valid pair. In 986, server 906 may also validate the requests in addition to validating that device A and device B are a valid pair before granting the request from device A. In certain embodiments, the server 906 may calculate hash (request) with the request sent by device A and determine whether calculated value matches hash(request) sent by device B. Upon determining that all the requisite conditions have been satisfied, server 906 grants the request from device A.

Certain embodiments may enable a first device to securely obtain data from a server without requiring the first device to connect directly with the server. In some embodiments, the first device may not directly access the server and can only connect to a hub via a local network or low power wireless network such as BLE. The first device may utilize another device as a hub to obtain access to the server.

Figure 10:
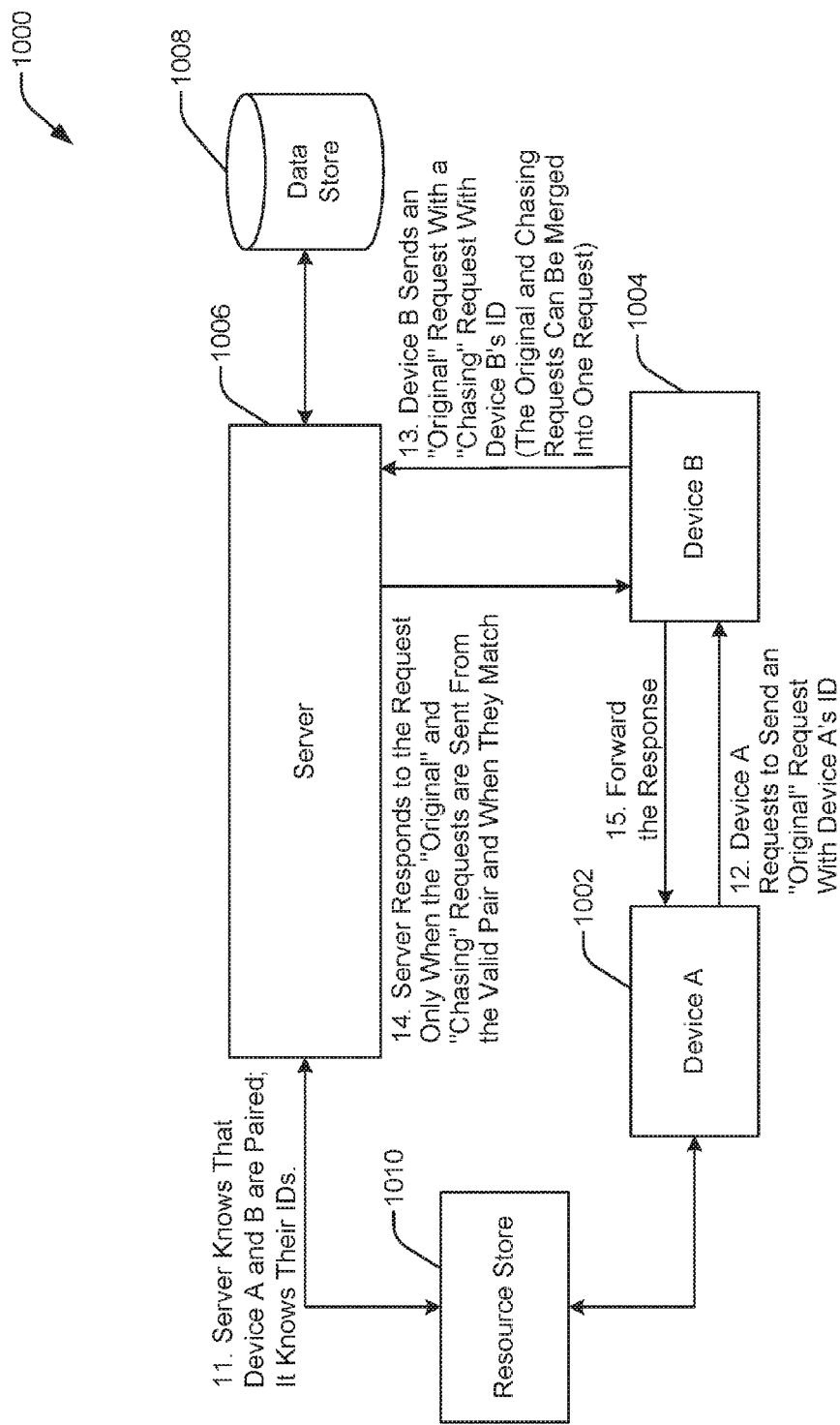
FIG. 10 illustrates a block diagram of a computing environment according to some embodiments.

FIG. 10 illustrates a block diagram of a computing environment 1000 according to some embodiments. Computing environment 1000 can include a plurality of computing devices such as devices 1002 and 1004 and one or more servers including server 1006. The plurality of computing devices can be communicatively coupled to the one or more servers via a communication network. Computing environment 1000 can also include a data store 1008 for storing information, such as device pairing information (e.g. valid pair, valid set information), and a resource store 1010 for storing information regarding a resource that a device may want to access.

In FIG. 10, device A 1002 may not be able to directly access server 1006. For example, device A 1002 may not be in a vicinity of server 1006 or device A 1002 may be unable to connect with server 1006. In some embodiments, device A 1002 may connect to other devices (e.g. device B 1004) via low power wireless networks such as BLE. In this example, device A 1002 may connect to device B 1004 that serves as a hub and provides access to server 1006. In 11, device A 1002 and device B 1004 may pre-register with server 1006 as a pair. In some embodiments, the server 1006 that device A 1002 and device 1004 may pre-register their group with is a registration server.

In 12, device A 1002 may request to send an original request with an identifier of device A 1002 to device B 1004. In 13, device B 1004 may send an original request with a chasing request along with an identifier of device B 1004 to server 1006. In some embodiments, the original and the chasing requests can be merged into a single request. In 14, server 1006 may determine whether the original and the chasing requests are sent from a valid pair. Upon determining that the requests are sent from a valid pair, server 1006 may respond to the request.

In some embodiments, server 1006 may also determine whether the original and the chasing requests match. Server 1006 may only respond to the request when the requests are from a valid pair and when the requests match in certain embodiments. Server 1006 may respond to the request through device B 1004. Device B 1004 may then forward the response to device A 1002.

Figure 11:
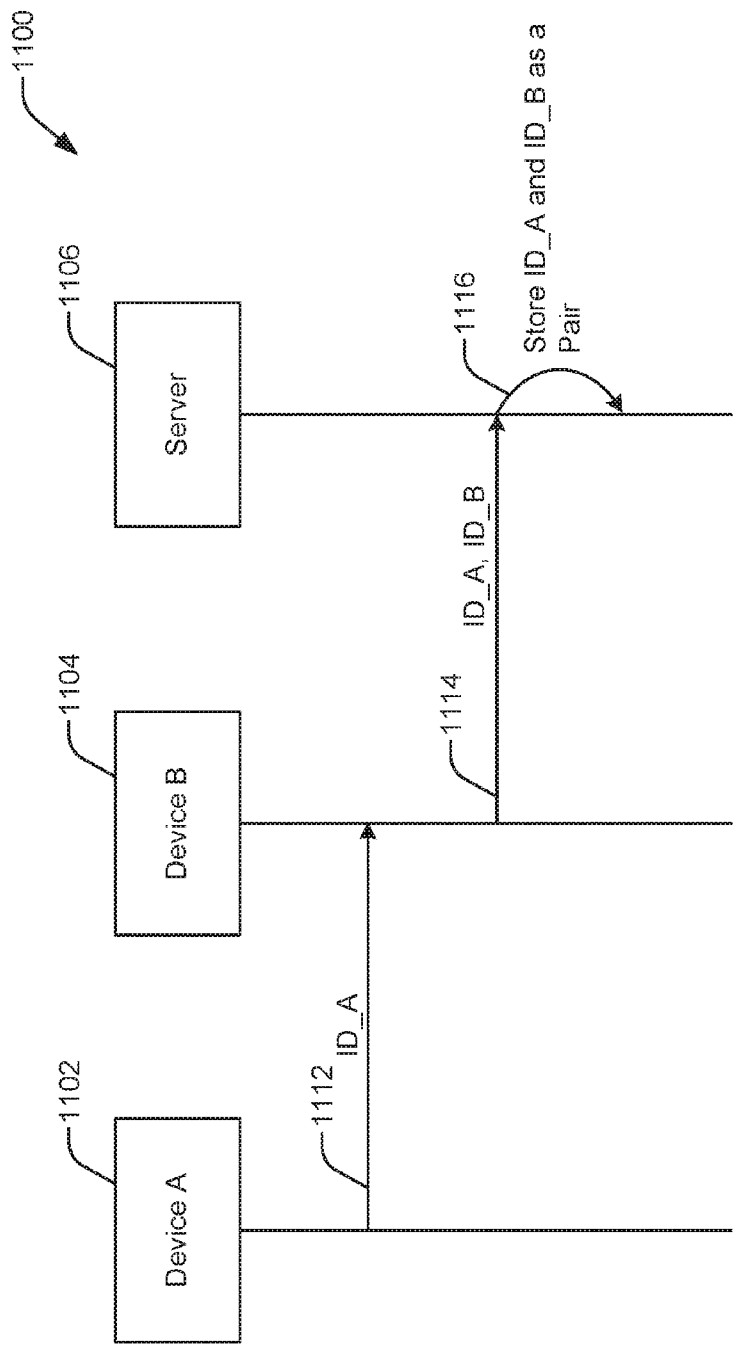
FIG. 11 illustrates an example device registration in accordance with some embodiments.

FIG. 11 illustrates an example method 1100 of performing device registration in accordance with some embodiments. In 1112, device A 1102 may forward an identifier of device A 1102 to device B 1104. At 1114, device B 1104 may then may forward the identifier of both device A and device B to server 1106. Server 1106 can be identified as a registration server or a pairing server. At 1116, server 1106 may store both the identifier of device A 1102 (e.g. ID_A) and the identifier of device B 1104 (e.g. ID_B) together as a pair. In some embodiments, there may be more than two devices stored as a valid grouping.

Figure 12:
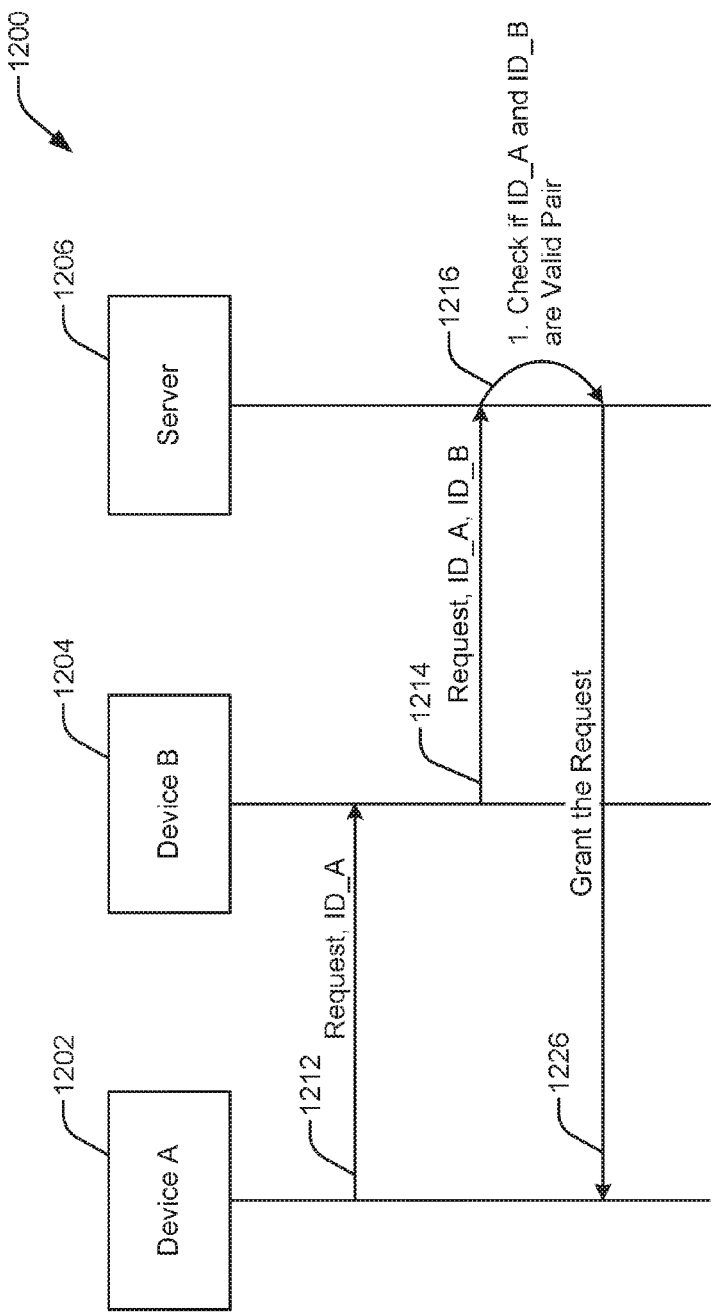
FIG. 12 illustrates an example of authorizing a request in accordance with some embodiments.

FIG. 12 illustrates an example of a method 1200 of authorizing a request in accordance with some embodiments. In 1212, device A 1202 may send an original request along with its identifier to device B 1204. In 1214, device B 1204 may send the original request (e.g. Request, ID_A) received from device A 1202 along with the identifier of device A 1202 and a chasing request (e.g. Request, ID_B) along with the identifier of device B 1204. In some embodiments, the original request and the chasing request may be merged into a single request to avoid redundancy.

Upon receiving the multiple requests (e.g. original request and chasing request), in 1216, server 1206 may check if device A 1202 and device B 1204 are a valid pair. Some embodiments may determine whether the two devices are a valid pair by determining whether the identifiers associated with the devices have been stored as a valid pair in a data store, indicating that the identifiers have been pre-registered as a pair. In 1226, server 1206 may grant the request upon determining that a number of conditions have been satisfied, such as that the ID of the first device A 1202 and the ID of the second device B 1204 are a valid pair.

Figure 13:
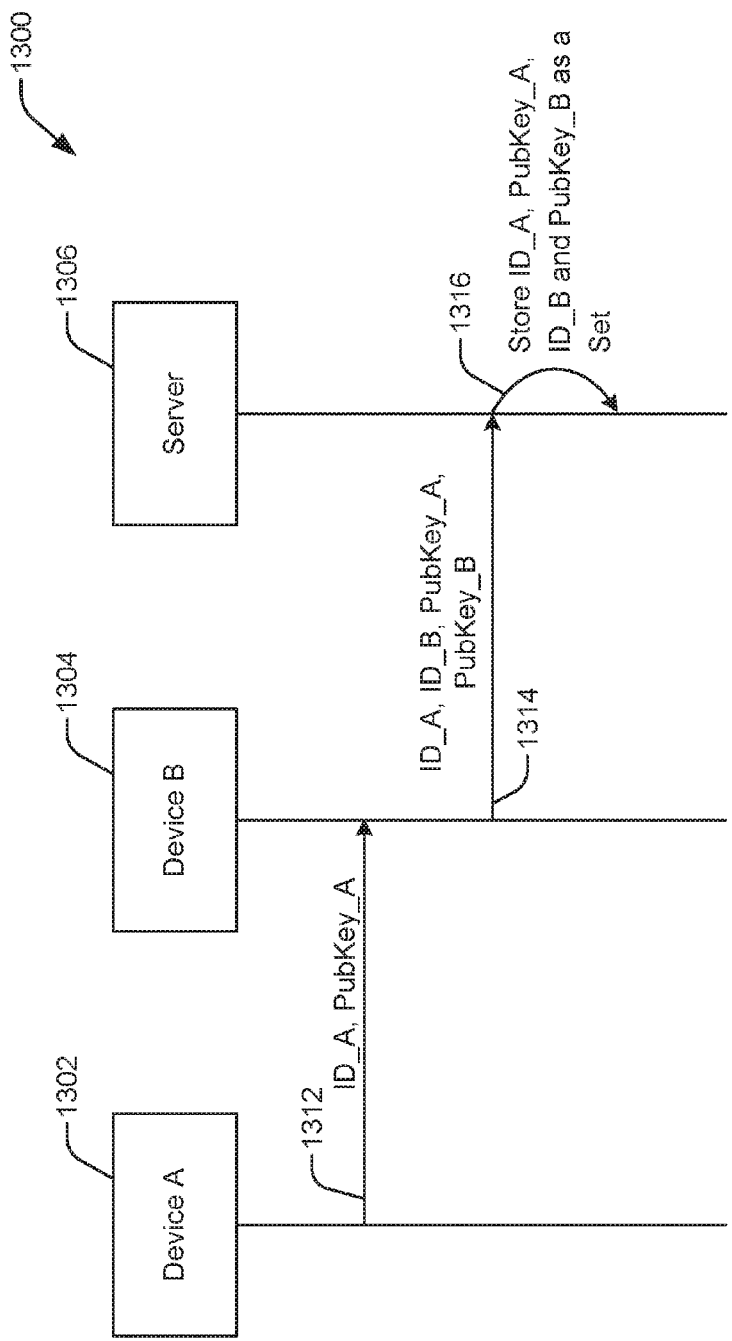
FIG. 13 illustrates an example of device registration in accordance with some embodiments.

Certain embodiments may increase security by allowing the devices to register their public keys with the server that can be later used for validating the signatures. FIG. 13 illustrates an example of a method 1300 for performing device registration in accordance with some embodiments. As shown, in 1312, device A 1302 may send its identifier (e.g. ID_A) and its public key (e.g. PubKey_A) to device B 1304. In 1314, device B 1304 may then forward the identifiers of device A 1302 (e.g. ID_A) and device B 1304 (e.g. ID_B) and the public keys of device A 1302 (e.g. PubKey_A) and device B 1304 (e.g. PubKey_B) to server 1306. Device B 1304 may register the public keys of device A 1302 and device B 1304 with server 1306 and indicate that device A 1302 and device B 1304 are a valid pair. In 1316, server 1306 may then store the identifiers and the public keys of device A 1302 and device B 1304 together as a set. Server 1306 may later use this information to validate the signatures and grant a request.

Figure 14:
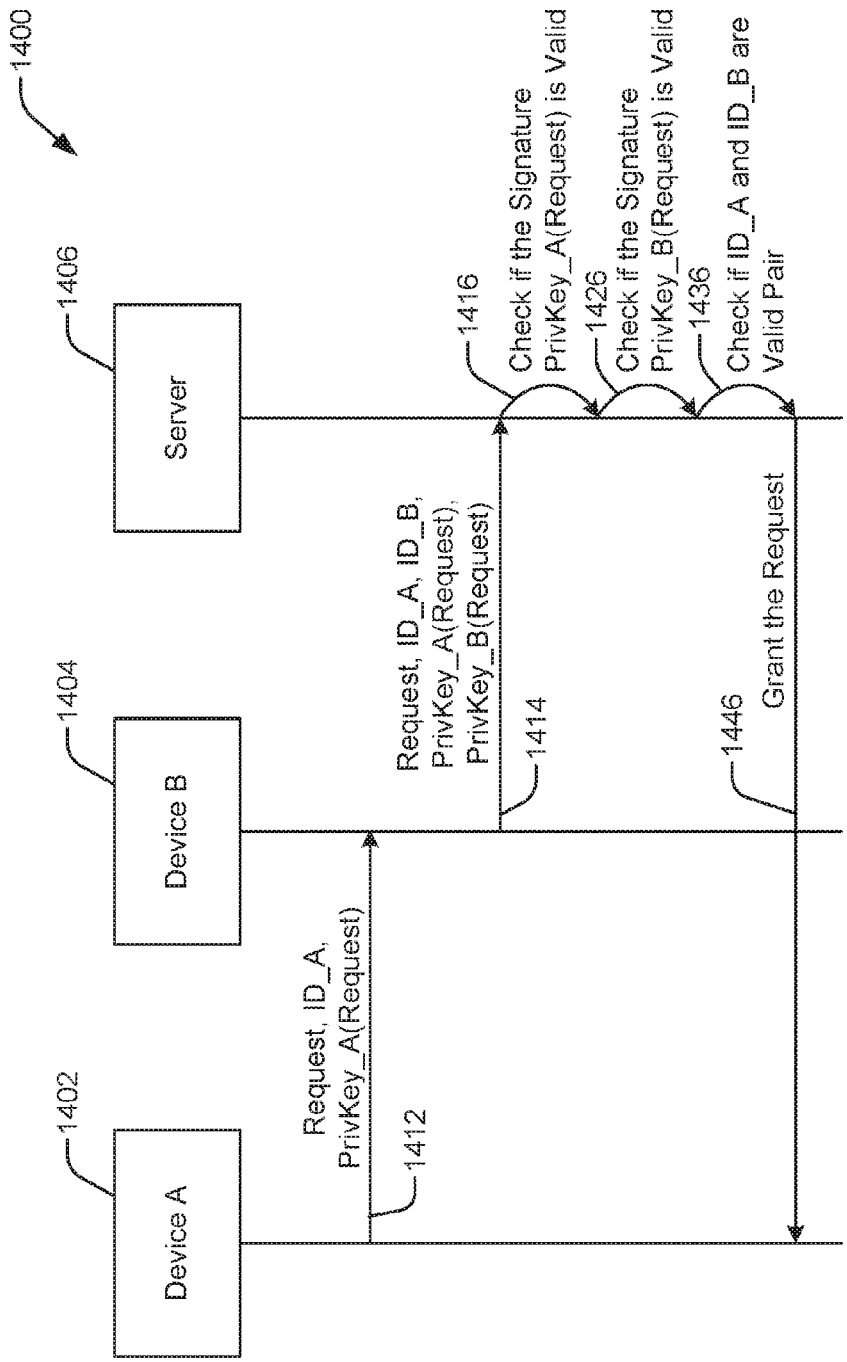
FIG. 14 illustrates an example of authorizing a request in accordance with some embodiments.

Some embodiments may have the servers validate the signatures of the received requests to ensure that the requests are coming from certain devices that may be a valid pair. FIG. 14 illustrates an example of a method 1400 of authorizing a request in accordance with some embodiments. As shown, the steps are similar to FIG. 12 but now the requests are sent along with the digital signatures. The server 1406 validates the signatures to ensure that the requests are coming from device A 1402 and device B 1404. Upon validating the signatures and ensuring that the requests are sent from devices that were pre-registered as a valid pair, the server grants the request.

In 1412, device A 1402 may send an original request along with its identifier and digital signature to device B 1404. In 1414, device B 1404 may send the original request received from device A 1402 along with the identifier of device A 1402 and the digital signature of device A 1402 (e.g. Request, ID_A, PrivKey_A(Request)) and a chasing request along with the identifier and digital signature of device B 1404 (e.g. Request, ID_B, PrivKey_B(Request)). In some embodiments, the original request and the chasing request may be merged into a single request to avoid redundancy. Upon receiving the multiple requests (e.g. original request and chasing request), in 1416, server 1406 may check if device A 1402 and device B 1404 are a valid pair.

In 1416, server 1406 can check if the digital signature of device A 1402 (e.g. PrivKey_A(Request)) is valid. In 1426, server 1406 can check if the digital signature of device B 1404 (e.g. PrivKey_B(Request)) is valid. In 1436, the server 1406 may determine whether the two devices are a valid pair by determining whether the identifiers associated with the devices have been stored as a valid pair in a data store, indicating that the identifiers have been pre-registered as a pair. In 1446, server 1406 may grant the request upon determining that a number of conditions have been satisfied.

Figure 15:
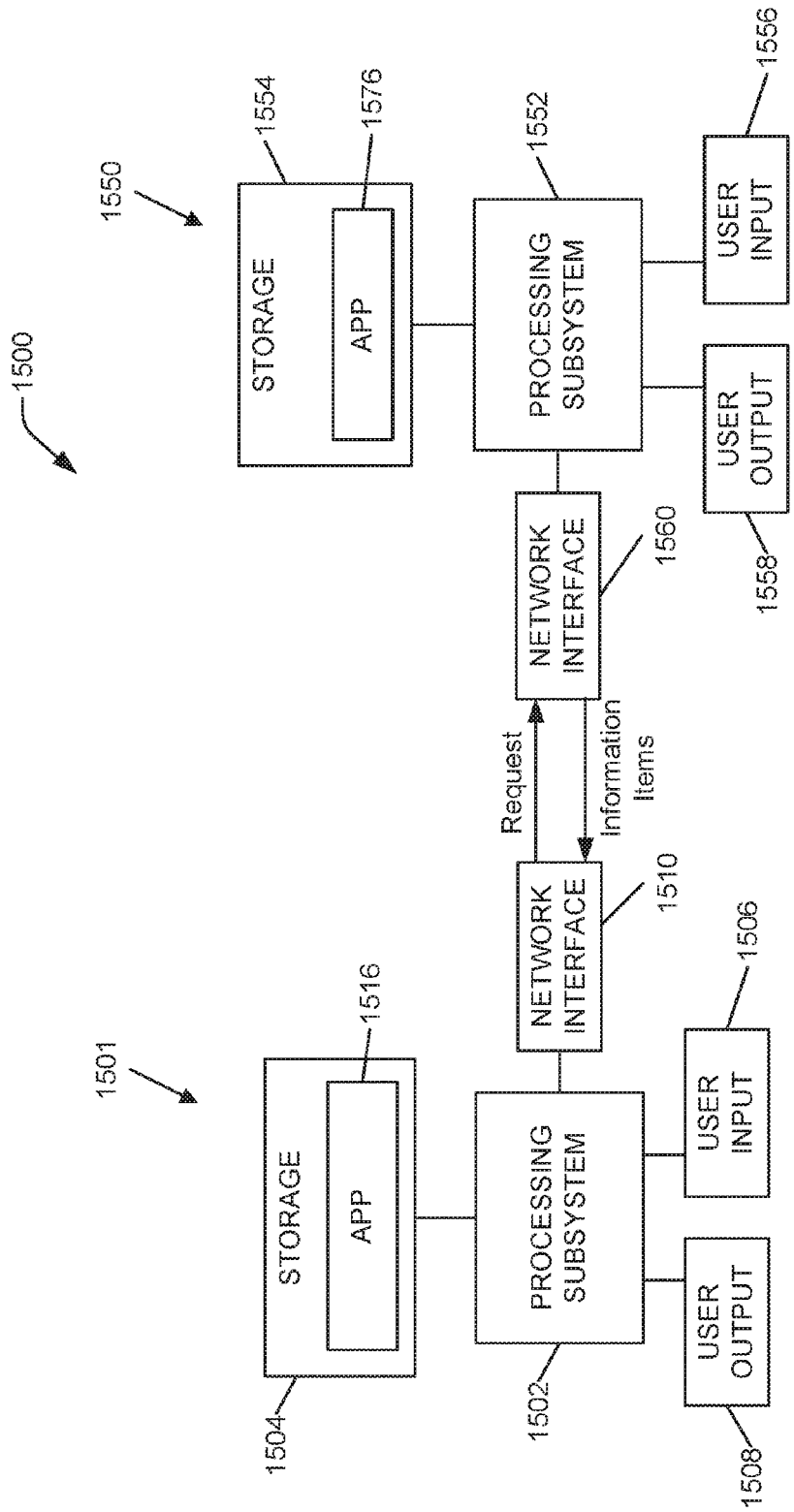
FIG. 15 illustrates a simplified block diagram of an implementation of a device and a server according to some embodiments.

FIG. 15 is a simplified block diagram of an implementation of device 1501 and a server 1550 in a system 1500 according to an embodiment. Device 1501 can be a mobile device, a handheld device, a notebook computer, a desktop computer, or any suitable electronic device with a screen for displaying images and that is capable of communicating with a server 1550 (e.g., a registration server, an authorization server, a pairing server, etc.) as described herein. Device 1501 includes a processing subsystem 1502, a storage subsystem 1504, a user input device 1506, a user output device 1508, and a network interface 1510.

Processing subsystem 1502, which can be implemented as one or more integrated circuits (e.g., e.g., one or more single-core or multi-core microprocessors or microcontrollers), can control the operation of device 1501. In various embodiments, processing subsystem 1502 can execute a variety of programs in response to program code and can maintain multiple concurrently executing programs or processes. At any given time, some or all of the program code to be executed can be resident in processing subsystem 1502 and/or in storage subsystem 1504.

Through suitable programming, processing subsystem 1502 can provide various functionality for device 1501. For example, processing subsystem 1502 can execute a particular application program (or "app") 1516. App 1516 can perform various methods for various functionalities of an application. In some embodiments, the user may send requests to a server to perform one or more actions such as uploading or downloading data or requesting information, etc.

Storage subsystem 1504 can be implemented, e.g., using disk, flash memory, or any other storage media in any combination, and can include volatile and/or non-volatile storage as desired. In some embodiments, storage subsystem 1504 can store one or more application programs to be executed by processing subsystem 1502 (e.g., app 1516). In some embodiments, storage subsystem 1504 can store other data (e.g., used by and/or defined by app 1516). Programs and/or data can be stored in non-volatile storage and copied in whole or in part to volatile working memory during program execution.

A user interface can be provided by one or more user input devices 1506 and one or more user output devices 1508. User input devices 1506 can include a touch pad, touch screen, scroll wheel, click wheel, dial, button, switch, keypad, microphone, or the like. User output devices 1508 can include a video screen, indicator lights, speakers, headphone jacks, or the like, together with supporting electronics (e.g., digital-to-analog or analog-to-digital converters, signal processors, or the like). A customer can operate input devices 1506 to invoke the functionality of device 1501 and can view and/or hear output from device 1501 via output devices 1508.

Network interface 1510 can provide voice and/or data communication capability for device 1501. For example, network interface 1510 can provide device 1501 with the capability of communicating with server 1550. In some embodiments network interface 1510 can include radio frequency (RF) transceiver components for accessing wireless voice and/or data networks (e.g., using cellular telephone technology, advanced data network technology such as 3G, 4G or EDGE, WiFi (IEEE 802.11 family standards, or other mobile communication technologies, or any combination thereof), and/or other components. In some embodiments network interface 1510 can provide wired network connectivity (e.g., Ethernet) in addition to or instead of a wireless interface. Network interface 1510 can be implemented using a combination of hardware (e.g., antennas, modulators/demodulators, encoders/decoders, and other analog and/or digital signal processing circuits) and software components.

Server 1550 may be used for any server mentioned herein. Server 1550 includes a processing subsystem 1552, storage subsystem 1554, a user input device 1556, a user output device 1558, and a network interface 1560. Network interface 1560 can have similar or identical features as network interface 1510 of device 1501 described above.

Processing subsystem 1552, which can be implemented as one or more integrated circuits (e.g., a conventional microprocessor or microcontroller), can control the operation of server 1550. In various embodiments, processing subsystem 1552 can execute a variety of programs in response to program code and can maintain multiple concurrently executing programs or processes. At any given time, some or all of the program code to be executed can be resident in processing subsystem 1552 and/or in storage subsystem 1554. Through suitable programming, processing subsystem 1552 can provide various functionalities for server 1550. Thus, server 1550 can interact with app 1516 being executed on device 1501 in order to provide information item(s) to device 1501.

Storage subsystem 1554 can be implemented, e.g., using disk, flash memory, or any other storage media in any combination, and can include volatile and/or non-volatile storage as desired. In some embodiments, storage subsystem 1554 can store one or more application programs to be executed by processing subsystem 1552. For example, an application program 1576 can interface with app 1516 to respond to requests for information. In some embodiments, storage subsystem 1554 can store other data, such as pairing information for multiple devices and public keys associated with different devices. Programs and/or data can be stored in non-volatile storage and copied in whole or in part to volatile working memory during program execution.

A user interface can be provided by one or more user input devices 1556 and one or more user output devices 1558. User input and output devices 1556 and 1558 can be similar or identical to user input and output devices 1506 and 1508 of device 1501 described above. In some instances, user input and output devices 1556 and 1558 are configured to allow a programmer to interact with server 1550. In some instances, server 1550 can be implemented at a server farm, and the user interface need not be local to the servers.

It will be appreciated that device 1501 and server 1550 described herein are illustrative and that variations and modifications are possible. A device can be implemented as a mobile electronic device and can have other capabilities not specifically described herein (e.g., telephonic capabilities, power management, accessory connectivity, etc.). In a system with multiple devices 1501 and/or multiple servers 1550, different devices 1501 and/or servers 1550 can have different sets of capabilities; the various devices 1501 and/or servers 1550 can be but need not be similar or identical to each other.

Further, while device 1501 and server 1550 are described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments can be realized in a variety of apparatus including electronic devices implemented using any combination of circuitry and software.

Additionally, while device 1501 and server 1550 are described as singular entities, it is to be understood that each can include multiple coupled entities. For example, server 1550 can include, a server, a set of coupled servers, a computer and/or a set of coupled computers.

It should be understood that any of the embodiments can be implemented in the form of control logic using hardware (e.g. an application specific integrated circuit or field programmable gate array) and/or using computer software with a generally programmable processor in a modular or integrated manner. As user herein, a processor includes a multi-core processor on a same integrated chip, or multiple processing units on a single circuit board or networked. Based on the disclosure and teachings provided herein, a person of ordinary skill in the art will know and appreciate other ways and/or methods to implement embodiments using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of the embodiments. However, other embodiments may be directed to specific embodiments relating to each individual aspect, or specific combinations of these individual aspects The above description of certain embodiments has been presented for the purposes of illustration and description. It is not intended to be exhaustive or to limit the embodiments to the precise form described, and many modifications and variations are possible in light of the teaching above. The embodiments were chosen and described in order to best explain the principles of the embodiments and its practical applications to thereby enable others skilled in the art to best utilize the various embodiments and with various modifications as are suited to the particular use contemplated.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although certain embodiments have been described, these are not intended to be limiting. Various modifications and equivalents are within the scope of the following claims.

What is claimed is:

1. A method comprising:
   receiving, by a server, a request from a first device to register the first device and a second device as paired devices, wherein the first device has a first identifier and the second device has a second identifier, wherein the first identifier comprises a unique hash value of the first device and wherein the second identifier comprises a unique hash value of the second device;
   storing the first identifier and the second identifier as a valid pair;
   receiving an original request from the first device, wherein the original request includes the first identifier associated with the first device;
   receiving a chasing request from the second device, wherein the chasing request includes the second identifier associated with the second device;
   determining whether the first device and the second device are the valid pair based on the first identifier in the original request and the second identifier in the chasing request;
   determining whether a portion of information in the original request matches a portion of information in the chasing request; and
   granting the original request upon determining that the first device and the second device are the valid pair, and upon determining that the portion of the original request matches the portion of the chasing request; and
   denying the original request upon determining either that the first device and the second device are not a valid pair, or that the portion of the original request does not match the portion of the chasing request.

2. The method according to claim 1, wherein the first identifier comprises unique identification information that identifies the first device and wherein the second identifier comprises unique identification information that identifies the second device.

3. The method according to claim 1, wherein the first identifier comprises a unique identification number of the first device and wherein the second identifier comprises a unique identification number of the second device.

4. The method according to claim 1, wherein the responding to the original request comprises granting the first device access to content managed by the server.

5. The method according to claim 1, wherein the first device sends a first message to the second device subsequent to sending the original request to the server and wherein the first message requests the second device to send the chasing request.

6. The method according to claim 1, wherein the server sends a server message to the second device subsequent to receiving the original request from the first device and wherein the server message requests the second device to send the chasing request.

7. The method according to claim 1, wherein the portion of information in the original request and the portion of information in the chasing request match when content of the original request and content of the chasing request are the same.

8. The method according to claim 1, wherein the portion of information in the original request and the portion of information in the chasing request match when a hash value of the original request and a hash value of the chasing request are the same.

9. A system comprising:
a memory; and
one or more processors coupled to the memory and configured to:
receive a request from a first device to register the first device and a second device as paired devices, wherein the first device has a first identifier and first additional information and the second device has a second identifier and second additional information,
wherein the first additional information comprises encryption information of the first device and wherein the second additional information comprises encryption information of the second device, and wherein the encryption information of the first device comprises one of a digital signature signed by a private key of the first device and a public key of the first device, and wherein the encryption information of the second device comprises one of a digital signature signed by a private key of the second device and a public key of the second device;
store the first identifier and the first additional information of the first device with the second identifier and the second additional information of the second device as a valid set;
receive an original request from the first device, wherein the original request includes the first identifier and the first additional information associated with the first device;
receive a chasing request from the second device, wherein the chasing request includes the second identifier and the second additional information associated with the second device;
determine whether the first device and the second device are the valid set based on the first identifier and first additional information in the original request and the second identifier and second additional information in the chasing request; and
in response to determining that the first device and the second device are the valid set respond to the original request from the first device.

10. The system according to claim 9, wherein the one or more processors configured to determine whether the first device and the second device are the valid set further comprises one or more processors configured to:
determine whether the digital signature signed by the private key of the first device is valid using the public key of the first device; and
determine whether the digital signature signed by the private key of the second device is valid using the public key of the second device.

11. The system according to claim 9, wherein the one or more processors configured to determine whether the first device and the second device are the valid set comprises one or more processors configured to determine whether the first device and the second device are a valid pair based on the first identifier in the original request and the second identifier in the chasing request.

12. The system according to claim 9, wherein the one or more processors configured to determine whether the first device and the second device are the valid set comprises one or more processors configured to determine whether content of the original request and content of the chasing request match.

13. The system according to claim 9, wherein the one or more processors configured to determine whether the first device and the second device are the valid set comprises one or more processors configured to determine whether a hash value of the original request and a hash value of the chasing request match.

14. The system according to claim 9, wherein the first identifier comprises unique identification information that identifies the first device and wherein the second identifier comprises unique identification information that identifies the second device.

15. A method comprising:
receiving, by a server, a request from a first device to register the first device and a second device as paired devices, the first device having a first identifier and first additional information and the second device having a second identifier and second additional information,
wherein the first additional information comprises encryption information of the first device and wherein the second additional information comprises encryption information of the second device, and wherein the encryption information of the first device comprises one of a digital signature signed by a private key of the first device and a public key of the first device, and wherein the encryption information of the second device comprises one of a digital signature signed by a private key of the second device and a public key of the second device;
storing the first identifier and first additional information and the second identifier and second additional information as a valid set;
receiving an original request and a chasing request from the second device, wherein the original request includes the first identifier and first additional information associated with the first device, and wherein the chasing request includes the second identifier and second additional information associated with the second device;
determining whether the first device and the second device are the valid set based on the first identifier and first additional information in the original request and the second identifier and second additional information in the chasing request; and
in response to determining that the first device and the second device are the valid set, responding to the original request.

16. The method according to claim 15, wherein prior to the receiving the original request and the chasing request from the second device, sending, by the first device, the original request to the second device.

17. The method according to claim 15, wherein the first identifier comprises unique identification information that identifies the first device and wherein the second identifier comprises unique identification information that identifies the second device.

18. A non-transitory computer-readable storage medium storing instructions which, when executed by one or more processors of a computing device, cause the one or more processors to perform a method comprising:
 receiving, by a server, a request from a first device to register the first device and a second device as paired devices, the first device having a first identifier and first additional information and the second device having a second identifier and second additional information,
 wherein the first additional information comprises encryption information of the first device and wherein the second additional information comprises encryption information of the second device, and wherein the encryption information of the first device comprises one of a digital signature signed by a private key of the first device and a public key of the first device, and wherein the encryption information of the second device comprises one of a digital signature signed by a private key of the second device and a public key of the second device;
 storing the first identifier and first additional information and the second identifier and second additional information as a valid set;
 receiving an original request and a chasing request from the second device, wherein the original request includes the first identifier and first additional information associated with the first device, and wherein the chasing request includes the second identifier and second additional information associated with the second device;
 determining whether the first device and the second device are the valid set based on the first identifier and first additional information in the original request and the second identifier and second additional information in the chasing request; and
 in response to determining that the first device and the second device are the valid set, responding to the original request.

19. A system comprising:
 a memory; and
 one or more processors coupled to the memory and configured to:
  receiving, by a server, a request from a first device to register the first device and a second device as paired devices, wherein the first device has a first identifier and the second device has a second identifier, wherein the first identifier comprises a unique hash value of the first device and wherein the second identifier comprises a unique hash value of the second device;
  storing the first identifier and the second identifier as a valid pair;
  receiving an original request from the first device, wherein the original request includes the first identifier associated with the first device;
  receiving a chasing request from the second device, wherein the chasing request includes the second identifier associated with the second device;
  determining whether the first device and the second device are the valid pair based on the first identifier in the original request and the second identifier in the chasing request;
  determining whether a portion of information in the original request matches a portion of information in the chasing request; and
  granting the original request upon determining that the first device and the second device are the valid pair, and upon determining that the portion of the original request matches the portion of the chasing request; and
  denying the original request upon determining either that the first device and the second device are not a valid pair, or that the portion of the original request does not match the portion of the chasing request.

20. A non-transitory computer-readable storage medium storing instructions which, when executed by one or more processors of a computing device, cause the one or more processors to perform a method comprising:
 receiving, by a server, a request from a first device to register the first device and a second device as paired devices, wherein the first device has a first identifier and the second device has a second identifier, wherein the first identifier comprises a unique hash value of the first device and wherein the second identifier comprises a unique hash value of the second device;
 storing the first identifier and the second identifier as a valid pair;
 receiving an original request from the first device, wherein the original request includes the first identifier associated with the first device;
 receiving a chasing request from the second device, wherein the chasing request includes the second identifier associated with the second device;
 determining whether the first device and the second device are the valid pair based on the first identifier in the original request and the second identifier in the chasing request;
 determining whether a portion of information in the original request matches a portion of information in the chasing request; and
 granting the original request upon determining that the first device and the second device are the valid pair, and upon determining that the portion of the original request matches the portion of the chasing request; and
 denying the original request upon determining either that the first device and the second device are not a valid pair, or that the portion of the original request does not match the portion of the chasing request.

* * * * *